US012756951B2

(12) United States Patent
Monoi

(10) Patent No.: US 12,756,951 B2
(45) Date of Patent: Oct. 6, 2026

(54) PHOTON COUNTING PIXEL AND METHOD OF OPERATION THEREOF

(71) Applicant: HUAWEI TECHNOLOGIES CO., LTD., Shenzhen (CN)

(72) Inventor: Makoto Monoi, Tokyo (JP)

(73) Assignee: Huawei Technologies Co., Ltd., Shenzhen (CN)

(*) Notice: Subject to any disclaimer, the term of this patent is extended or adjusted under 35 U.S.C. 154(b) by 110 days.

(21) Appl. No.: 18/868,728

(22) PCT Filed: Aug. 9, 2022

(86) PCT No.: PCT/CN2022/110996
§ 371 (c)(1),
(2) Date: Nov. 22, 2024

(87) PCT Pub. No.: WO2024/031300
PCT Pub. Date: Feb. 15, 2024

(65) Prior Publication Data
US 2025/0350861 A1 Nov. 13, 2025

(51) Int. Cl.
*H04N 25/60* (2023.01)
*H04N 25/771* (2023.01)
(Continued)

(52) U.S. Cl.
CPC ........... *H04N 25/60* (2023.01); *H04N 25/771* (2023.01); *H04N 25/773* (2023.01); *H04N 25/778* (2023.01); *H04N 25/78* (2023.01)

(58) Field of Classification Search
CPC .... H04N 25/60; H04N 25/771; H04N 25/773; H04N 25/778; H04N 25/78; H04N 25/59;
(Continued)

(56) References Cited

U.S. PATENT DOCUMENTS 11,252,352 B2 2/2022 Boukhayma
2005/0219884 A1 10/2005 Manabe et al.
(Continued)

OTHER PUBLICATIONS

Ma et al., "A 0.19e-rms Read Noise 16.7Mpixel Stacked Quanta Image Sensor With 1.1 m-Pitch Backside Illuminated Pixels," IEEE Electron Device Letters, vol. 42, No. 6, total 4 pages (Jun. 2021).

*Primary Examiner* — Xi Wang
(74) *Attorney, Agent, or Firm* — Leydig, Voit & Mayer, Ltd.

(57) ABSTRACT

A photosensitive pixel comprises a photodiode; a first charge transfer gate; a charge storage and transfer electrode; a second charge transfer gate; a sensing node; a reset gate coupled to the charge storage and transfer electrode; a drain coupled to the reset gate; and an amplifier coupled to the sensing node. The first charge transfer gate is controlled via a first control signal from a controller to couple the photodiode to the charge storage and transfer electrode so as to allow charge transfer. The second charge transfer gate is controlled via a second control signal from the controller to couple the charge storage and transfer electrode to the sensing node so as to allow charge transfer. The second transfer gate, the charge storage and transfer electrode, and the reset gate are controlled via third control signals from the controller to reset an electric potential of the sensing node.

13 Claims, 29 Drawing Sheets

(51) Int. Cl.
*H04N 25/773* (2023.01)
*H04N 25/778* (2023.01)
*H04N 25/78* (2023.01)

(58) Field of Classification Search
CPC ... H04N 25/622; H04N 25/626; H04N 25/616
See application file for complete search history.

(56) References Cited

U.S. PATENT DOCUMENTS

| | | | | |
|---|---|---|---|---|
| 2007/0120982 | A1 | 5/2007 | Oita et al. | |
| 2013/0001404 | A1 | 1/2013 | Meynants | |
| 2013/0188078 | A1 | 7/2013 | Shim et al. | |
| 2017/0323912 | A1* | 11/2017 | Lahav | H10F 39/18 |
| 2020/0068155 | A1 | 2/2020 | Kitano | |
| 2020/0411572 | A1 | 12/2020 | Sekine | |

* cited by examiner

【Fig. 17】
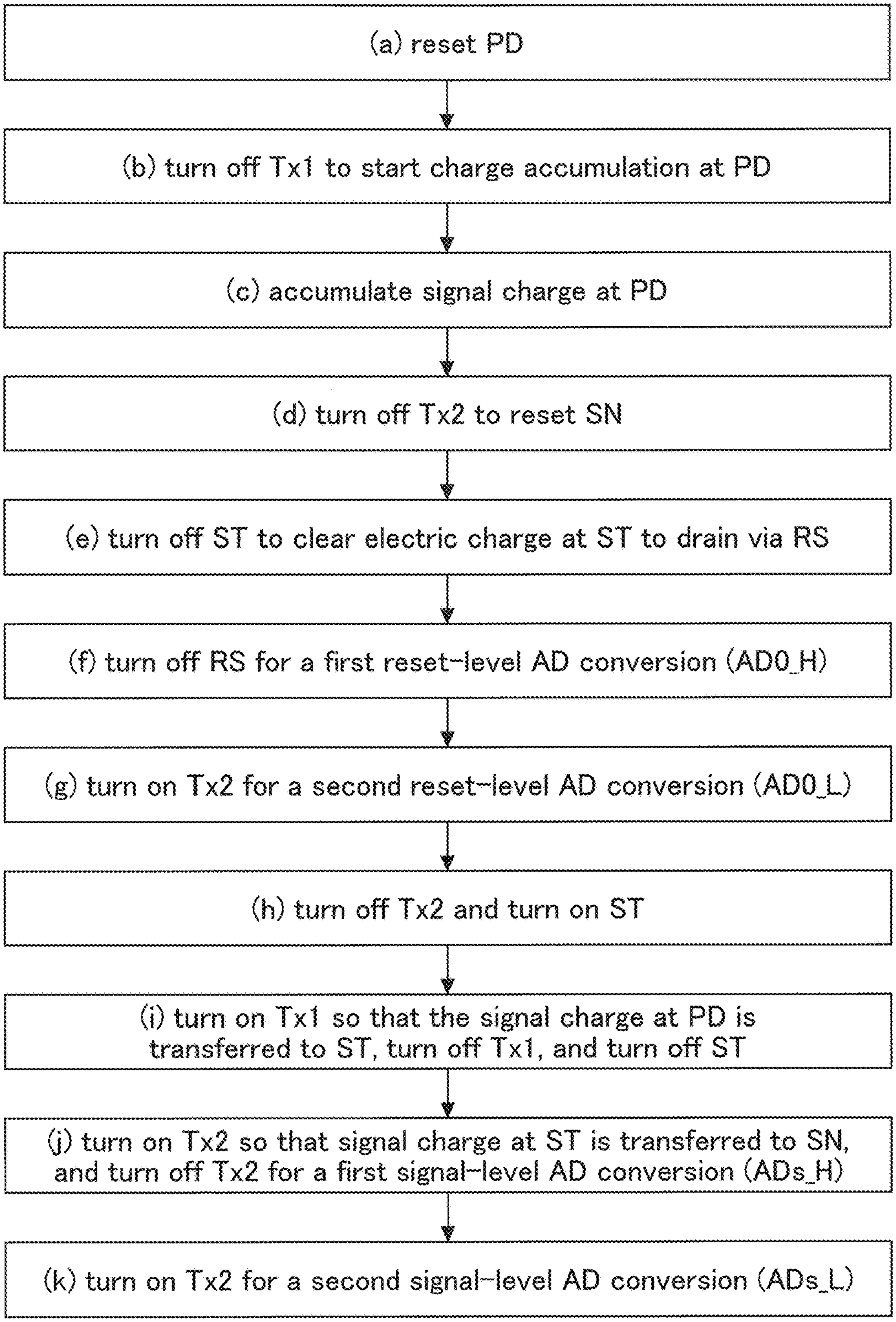

【Fig. 18】
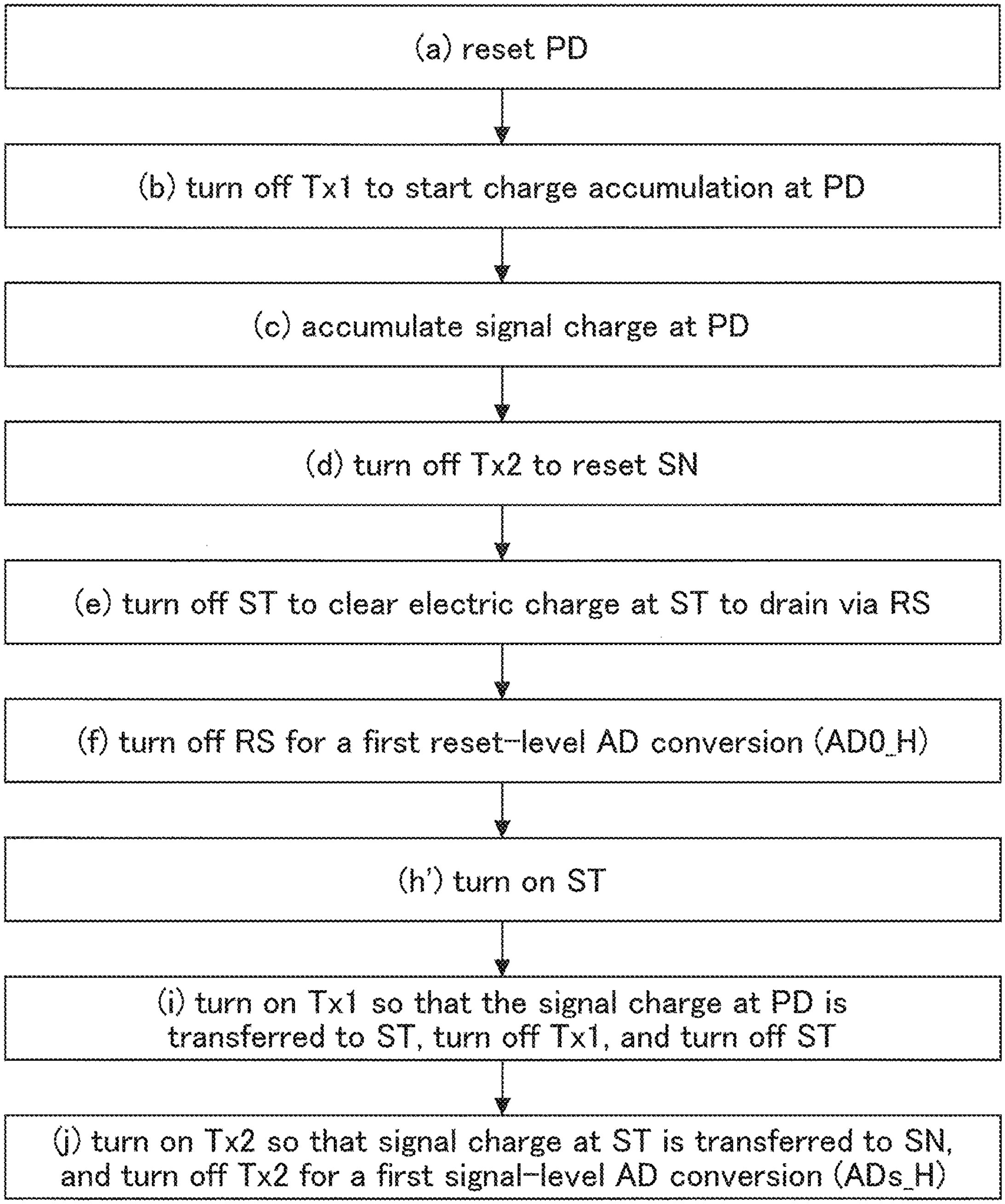

【Fig. 19】
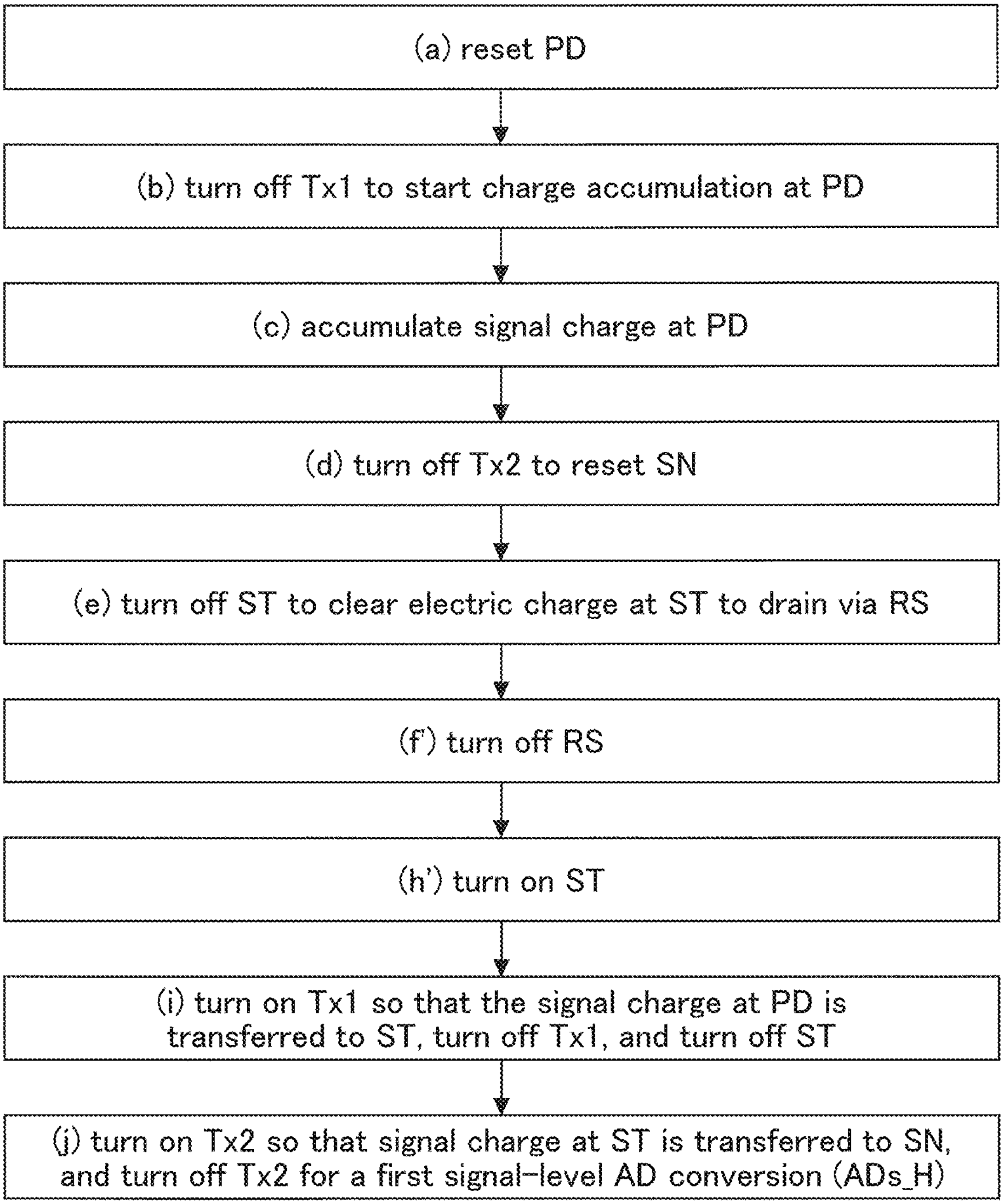

【Fig. 20】
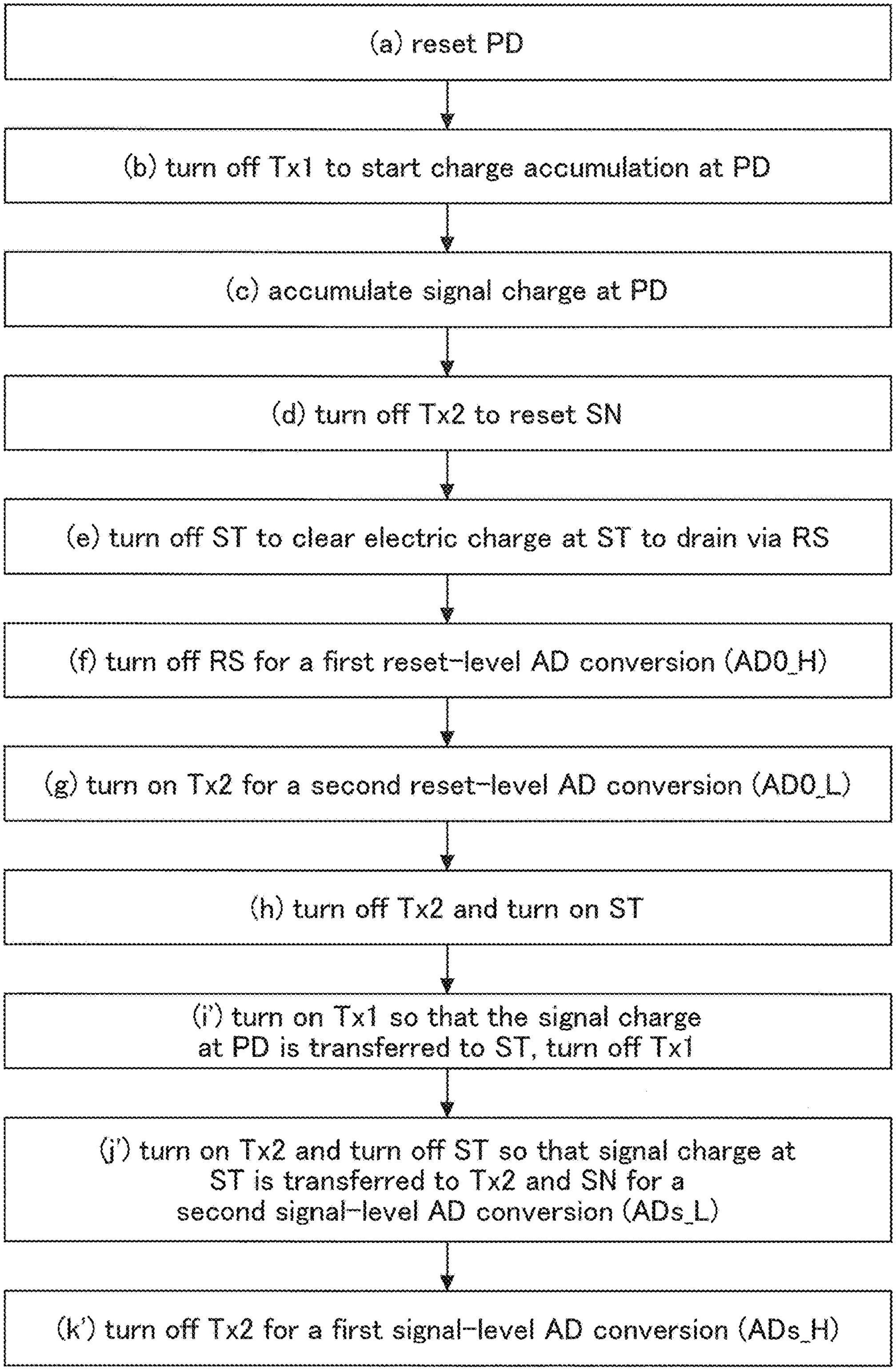

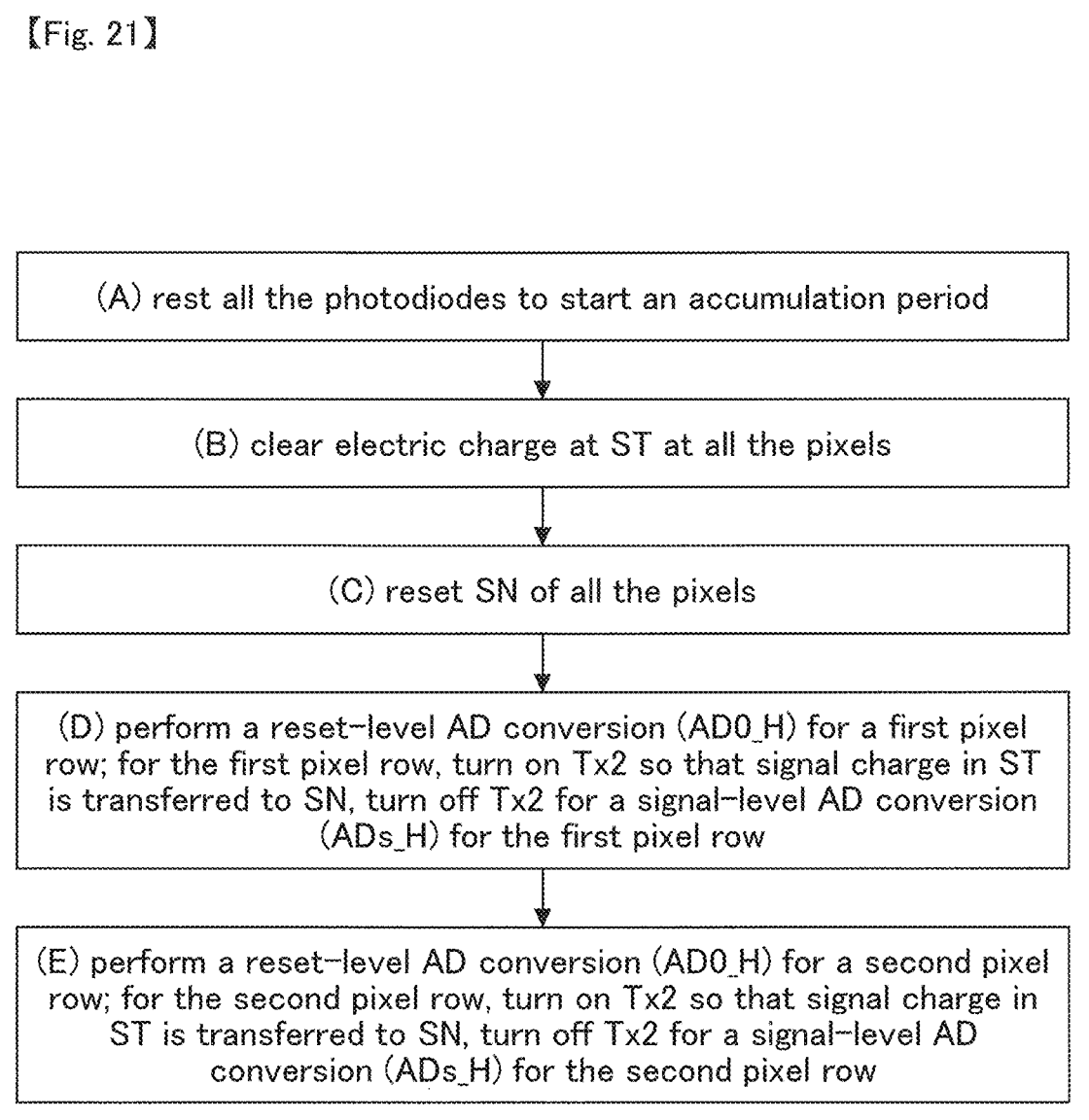

【Fig. 21】

(A) rest all the photodiodes to start an accumulation period

↓

(B) clear electric charge at ST at all the pixels

↓

(C) reset SN of all the pixels

↓

(D) perform a reset-level AD conversion (AD0_H) for a first pixel row; for the first pixel row, turn on Tx2 so that signal charge in ST is transferred to SN, turn off Tx2 for a signal-level AD conversion (ADs_H) for the first pixel row

↓

(E) perform a reset-level AD conversion (AD0_H) for a second pixel row; for the second pixel row, turn on Tx2 so that signal charge in ST is transferred to SN, turn off Tx2 for a signal-level AD conversion (ADs_H) for the second pixel row 【Fig. 24】

【Fig. 27】

PHOTON COUNTING PIXEL AND METHOD OF OPERATION THEREOF

CROSS-REFERENCE TO RELATED APPLICATIONS

This application is a national stage of International Application No. PCT/CN2022/110996, filed on Aug. 9, 2022, which is hereby incorporated by reference in its entirety.

TECHNICAL FIELD

Embodiments of this application relate to image sensors, in particular complementary metal-oxide-semiconductor (CMOS) image sensors, and a method of operation thereof.

BACKGROUND

Image sensors are commonly used in electronic devices such as digital cameras, video cameras, webcams, mobile phones, and computers in applications that involve capturing images.

Typically, an image sensor has an array of cells (pixels) arranged in rows and columns. Each cell contains a photosensitive element such as a photodiode (also referred to as a sensor element) that generates an electric charge in response to incident light.

In typical conventional image sensors, the generated electric charge is accumulated in a charge accumulation node (a capacitor-like structure often called a floating diffusion node FD) associated with the cell. An output electric signal corresponding to the light incident on the cell is generated from the electric charge accumulated in the floating diffusion node.

Most image sensors are either charge-coupled device (CCD) image sensors or complementary metal-oxide-semiconductor (CMOS) image sensors. CCD and CMOS image sensors differ in a signal readout method as well as in a manufacturing process.

In a CCD image sensor, an electric charge generated at a pixel in response to light is stored in a capacitor. The capacitors in one line are controlled to transfer their charge to their neighbors at once in a "bucket brigade" manner, and the capacitor at the end of the line outputs its charge to an amplifier. In contrast, in a CMOS image sensor, each pixel in the array has a photodiode and a switch (e.g., a transistor). Thus, control of the switches in the array allows directly accessing a signal from each pixel. CMOS image sensors can be made inexpensive as compared with CCD image sensors, because CMOS image sensors, complete with control circuitry, can be manufactured in an ordinary semiconductor manufacturing process.

A CMOS image sensor may include a pixel array and a readout circuit for taking out image signals from pixels. The readout circuit includes a row control circuit, a column control circuit, and a control circuit. As noted above, in a CMOS image sensor, by controlling the switches in the array, a signal from each pixel can be accessed directly.

An image signal corresponding to a pixel (cell) is read out by the readout circuit by rows and columns. Typically, in readout operations, a particular pixel row in the array may be selected by the row control circuit, and image signals generated by the pixels in that row are read out column by column along column lines by the column control circuit. An analog-to-digital conversion (ADC) circuit may be provided to convert the signals from the pixels to digital values.

An output of a photosensitive element is only responsive to the intensity of light, and does not provide color information. Thus, when it is desired to capture color images, a color filter array (CFA) may be provided. The color filter array includes color filter elements over the pixels of the pixel array. The color filter elements may include red, green, and blue color filter elements arranged in a so-called Bayer pattern, but other colors and/or other arrangement patterns may also be used.

Recently, a photon counting sensor has been developed that can detect very low level light and can even count every photon. For accurate photon counting, reduction of readout noise is desired.

SUMMARY

According to a first aspect of the present application, a photosensitive pixel is provided. According to a first implementation of the first aspect of the present application, the photosensitive pixel comprises a photodiode (PD) for generating photoelectrons; a first charge transfer gate (Tx1); a charge storage and transfer electrode (ST); a second charge transfer gate (Tx2); a sensing node (SN); a reset gate (RS) coupled to the charge storage and transfer electrode (ST); a drain (VD1) coupled to the reset gate; and an amplifier (AMP) coupled to the sensing node, wherein the first charge transfer gate (Tx1) is controlled via a first control signal from a controller to couple the photodiode (PD) to the charge storage and transfer electrode (ST) so as to allow charge transfer, wherein the second charge transfer gate (Tx2) is controlled via a second control signal from the controller to couple the charge storage and transfer electrode (ST) to the sensing node (SN) so as to allow charge transfer, wherein the second transfer gate (Tx2), the charge storage and transfer electrode (ST), and the reset gate (RS) are controlled via third control signals from the controller to reset an electric potential of the sensing node (SN), and wherein charge generated at the photodiode (PD) is transferred to the sensing node (SN) via the first charge transfer gate (Tx1), the charge storage and transfer electrode (ST), and the second charge transfer gate (Tx2).

In order to transfer electric charge from the photodiode (PD) to the sensing node (SN), this embodiment of the present application provides a charge storage and transfer electrode (ST) (as opposed to a diffusion region that does not have an electrode). Thus, the transfer of electric charge from the photodiode (PD) to the sensing node (SN) via the first charge transfer gate (Tx1), the charge storage and transfer electrode (ST), and the second charge transfer gate (Tx2) is a complete transfer. This eliminates or mitigates issues arising due to incomplete transfer of charge, such as noise or image lag due to electric charge persistent (remaining) from a previously captured frame. Further, the charge transfer of this embodiment requires less time than transferring electric charge from a diffusion region to a sensing node via a charge transfer gate, and allows a shorter conversion period.

Further, since the only gate adjacent to the sensing node (SN) is the second charge transfer gate (Tx2), electrostatic capacitance of the sensing node (SN) can be made smaller, which results in a higher charge-voltage conversion efficiency.

Further, apart from providing the charge storage and transfer electrode (ST), no special pixel structure is required, and manufacturing is facilitated.

Moreover, combining electrostatic capacity of the second charge transfer gate (Tx2) with that of the sensing node (SN) can effectively increase the capacitance of the sensing node (SN). When the second charge transfer gate (Tx2) is off, the small capacitance of the sensing node (SN) allows a high conversion gain, which is suitable for detection in low light conditions. When the second charge transfer gate (Tx2) is on, the capacitance of the second charge transfer gate (Tx2) is combined with that of the sensing node (see k in FIG. 7 described below). It results in a large effective capacitance and a low conversion gain, which is suitable for detection in bright conditions. Using the high conversion gain and the low conversion gain as appropriate, a high dynamic range (HDR) can be achieved.

According to a second implementation of the first aspect of the present application based on the first implementation of the first aspect of the present application, the first charge transfer gate (Tx1), the second charge transfer gate (Tx2), the reset gate (RS), and/or the charge storage and transfer electrode (ST) are formed as MOSFET transistors.

According to a third implementation of the first aspect of the present application based on any suitable one of the preceding implementations of the first aspect of the present application. The transfer of charge generated at the photodiode (PD) to the sensing node (SN) via the first charge transfer gate (Tx1), the charge storage and transfer electrode (ST), and the second charge transfer gate (Tx2) is implemented by steps of: (a) resetting the photodiode (PD) by clearing electric charge in the photodiode (PD); (b) turning off the first charge transfer gate (Tx1) to start charge accumulation at the photodiode; (c) accumulating signal charge at the photodiode (PD) during an accumulation period; (d) turning off the second charge transfer gate (Tx2) to reset the sensing node (SN); (e) turning off the charge storage and transfer electrode (ST) to clear electric charge at the charge storage and transfer electrode (ST) to the drain (VD1) via the reset gate (RS); (f) turning off the reset gate (RS) to perform, by an analog-to-digital converter (ADC), a first reset-level analog-to-digital (AD) conversion (AD0_H) on an output of the amplifier coupled to the sensing node (SN); (g) turning on the second charge transfer gate (Tx2) to perform, by the ADC, a second reset-level AD conversion (AD0_L) on an output of the amplifier coupled to the sensing node; (h) turning off the second charge transfer gate (Tx2) and turning on the charge storage and transfer electrode (ST); (i) turning on the first charge transfer gate (Tx1) so that the signal charge at the photodiode (PD) is transferred to the charge storage and transfer electrode (ST), turning off the first charge transfer gate (Tx1), and turning off the charge storage and transfer electrode (ST); (j) turning on the second charge transfer gate (Tx2) so that signal charge at the charge storage and transfer electrode (ST) is transferred to the sensing node (SN), and turning off the second charge transfer gate (Tx2) to perform, by the ADC, a first signal-level AD conversion (ADs_H) on an output of the amplifier coupled to the sensing node (SN); and (k) turning on the second charge transfer gate (Tx2) to perform, by the ADC, a second signal-level AD conversion (ADs_L) on an output of the amplifier coupled to the sensing node.

In this embodiment, techniques such as correlated double sampling (CDS) for suppressing kTC noise and dual conversion gain (DCG) for enlarging a dynamic range are advantageously implemented.

According to a fourth implementation of the first aspect of the present application based on any suitable one of the preceding implementations of the first aspect of the present application, the transfer of charge generated at the photodiode (PD) to the sensing node (SN) via the first charge transfer gate (Tx1), the charge storage and transfer electrode (ST), and the second charge transfer gate (Tx2) is implemented by steps of: (a) resetting the photodiode (PD) by clearing electric charge in the photodiode (PD); (b) turning off the first charge transfer gate (Tx1) to start charge accumulation at the photodiode; (c) accumulating signal charge at the photodiode (PD) during an accumulation period; (d) turning off the second charge transfer gate (Tx2) to reset the sensing node (SN); (e) turning off the charge storage and transfer electrode (ST) to clear electric charge at the charge storage and transfer electrode (ST) to the drain (VD1) via the reset gate (RS); (f) turning off the reset gate (RS) to perform, by an analog-to-digital converter (ADC), a first reset-level analog-to-digital (AD) conversion (AD0_H) on an output of the amplifier coupled to the sensing node (SN); (h') turning on the charge storage and transfer electrode (ST); (i) turning on the first charge transfer gate (Tx1) so that the signal charge at the photodiode (PD) is transferred to the charge storage and transfer electrode (ST), turning off the first charge transfer gate (Tx1), and turning off the charge storage and transfer electrode (ST); and (j) turning on the second charge transfer gate (Tx2) so that signal charge at the charge storage and transfer electrode (ST) is transferred to the sensing node (SN), and turning off the second charge transfer gate (Tx2) to perform, by the ADC, a first signal-level AD conversion (ADs_H) on an output of the amplifier coupled to the sensing node (SN).

According to a fifth implementation of the first aspect of the present application based on any suitable one of the preceding implementations of the first aspect of the present application, the transfer of charge generated at the photodiode (PD) to the sensing node (SN) via the first charge transfer gate (Tx1), the charge storage and transfer electrode (ST), and the second charge transfer gate (Tx2) is implemented by steps of: (a) resetting the photodiode (PD) by clearing electric charge in the photodiode (PD); (b) turning off the first charge transfer gate (Tx1) to start charge accumulation at the photodiode; (c) accumulating signal charge at the photodiode (PD) during an accumulation period; (d) turning off the second charge transfer gate (Tx2) to reset the sensing node (SN); (e) turning off the charge storage and transfer electrode (ST) to clear electric charge at the charge storage and transfer electrode (ST) to the drain (VD1) via the reset gate (RS); (f) turning off the reset gate (RS); (h') turning on the charge storage and transfer electrode (ST); (i) turning on the first charge transfer gate (Tx1) so that the signal charge at the photodiode (PD) is transferred to the charge storage and transfer electrode (ST), turning off the first charge transfer gate (Tx1), and turning off the charge storage and transfer electrode (ST); and (j) turning on the second charge transfer gate (Tx2) so that signal charge at the charge storage and transfer electrode (ST) is transferred to the sensing node (SN), and turning off the second charge transfer gate (Tx2) to perform, by the ADC, a first signal-level AD conversion (ADs_H) on an output of the amplifier coupled to the sensing node (SN).

According to a sixth implementation of the first aspect of the present application based on any of the third to fifth implementations of the first aspect of the present application, during the accumulation period, the second charge transfer gate (Tx2), the charge storage and transfer electrode (ST), and the reset gate (RS) are off.

The longer duration when the second charge transfer gate (Tx2), the charge storage and transfer electrode (ST), and the reset gate (RS) are off according to this implementation may reduce voltage stress on the second charge transfer gate (Tx2), the charge storage and transfer electrode (ST), and the reset gate (RS), in particular on oxides thereof.

According to a seventh implementation of the first aspect of the present application based on the first or second implementation of the first aspect of the present application, the transfer of charge generated at the photodiode (PD) to the sensing node (SN) via the first charge transfer gate (Tx1), the charge storage and transfer electrode (ST), and the second charge transfer gate (Tx2) is implemented by steps of: (a) resetting the photodiode (PD) by clearing electric charge in the photodiode (PD); (b) turning off the first charge transfer gate (Tx1) to start charge accumulation at the photodiode; (c) accumulating signal charge at the photodiode (PD) during an accumulation period; (d) turning off the second charge transfer gate (Tx2) to reset the sensing node (SN); (e) turning off the charge storage and transfer electrode (ST) to clear electric charge at the charge storage and transfer electrode (ST) to the drain (VD1) via the reset gate (RS); (f) turning off the reset gate (RS) to perform, by an analog-to-digital converter (ADC), a first reset-level analog-to-digital (AD) conversion (AD0_H) on an output of the amplifier coupled to the sensing node (SN); (g) turning on the second charge transfer gate (Tx2) to perform, by the ADC, a second reset-level AD conversion (AD0_L) on an output of the amplifier coupled to the sensing node; (h) turning off the second charge transfer gate (Tx2) and turning on the charge storage and transfer electrode (ST); (i') turning on the first charge transfer gate (Tx1) so that the signal charge at the photodiode (PD) is transferred to the charge storage and transfer electrode (ST), turning off the first charge transfer gate (Tx1); (j') turning on the second charge transfer gate (Tx2) and then turning off the charge storage and transfer electrode (ST) so that signal charge at the charge storage and transfer electrode (ST) is transferred to the second charge transfer gate (Tx2) and the sensing node (SN) to perform, by the ADC, a second signal-level AD conversion (ADs_L) on an output of the amplifier coupled to the sensing node (SN); and (k') turning off the second charge transfer gate (Tx2) to perform, by the ADC, a first signal-level AD conversion (ADs_H) on an output of the amplifier coupled to the sensing node.

According to this embodiment, in step (i'), the charge storage and transfer electrode (ST) remain on (low) after the first charge transfer gate (Tx1) is turned off. Since this results in a deeper level of the charge storage and transfer electrode (ST), more electric charge (than in the case of FIG. 7) is stored in step (i'), and more electric charge is transferred to the sensing node (SN) when the second charge transfer gate (Tx2) is turned on in step (j').

According to an eighth implementation of the first aspect of the present application based on any suitable one of the preceding implementations of the first aspect of the present application, the photosensitive pixel further comprises an overflow channel (OFC) for letting overflow electric charge flow out to the drain.

According to second aspect of the present application, a pixel array is provided. The pixel array may comprise a plurality of photosensitive pixels as in the first aspect of the present application. For example, the pixel array may comprise a plurality of photosensitive pixels arranged in an array of a plurality of rows and a plurality of columns, wherein each photosensitive pixel comprises: a photodiode (PD) for generating photoelectrons; a first charge transfer gate (Tx1); a charge storage and transfer electrode (ST); a second charge transfer gate (Tx2); a sensing node (SN); a reset gate (RS) coupled to the charge storage and transfer electrode (ST); a drain (VD1) coupled to the reset gate; and an amplifier (AMP) coupled to the sensing node, wherein the first charge transfer gate (Tx1) is controlled via a first control signal from a controller to couple the photodiode (PD) to the charge storage and transfer electrode (ST) so as to allow charge transfer, wherein the second charge transfer gate (Tx2) is controlled via a second control signal from the controller to couple the charge storage and transfer electrode (ST) to the sensing node (SN) so as to allow charge transfer, wherein the second transfer gate (Tx2), the charge storage and transfer electrode (ST), and the reset gate (RS) are controlled via third control signals from the controller to reset an electric potential of the sensing node (SN), and wherein charge generated at the photodiode (PD) is transferred to the sensing node (SN) via the first charge transfer gate (Tx1), the charge storage and transfer electrode (ST), and the second charge transfer gate (Tx2).

According to a second implementation of the second aspect of the present application based on the first implementation of the second aspect of the present application, more than one photosensitive pixel shares the charge storage and transfer electrode (ST), the second charge transfer gate (Tx2), the sending node (SN), the reset gate (RS), the drain (VD1), and the amplifier (AMP).

According to a third implementation of the second aspect of the present application, a pixel array comprises a plurality of groups of photosensitive pixels, each group of photosensitive pixels comprising: a plurality of photodiodes (PD) for generating photoelectrons; a plurality of first charge transfer gate (Tx1) associated with the plurality of photodiodes (PD) respectively; a shared charge storage and transfer electrode (ST); a shared second charge transfer gate (Tx2); a shared sensing node (SN); a shared reset gate (RS) coupled to the charge storage and transfer electrode (ST); a shared drain (VD1) coupled to the reset gate; and a shared amplifier (AMP) coupled to the sensing node, wherein the first charge transfer gate (Tx1) is controlled via a first control signal from a controller to couple the associated photodiode (PD) to the charge storage and transfer electrode (ST) so as to allow charge transfer, wherein the second charge transfer gate (Tx2) is controlled via a second control signal from the controller to couple the charge storage and transfer electrode (ST) to the sensing node (SN) so as to allow charge transfer, wherein the second transfer gate (Tx2), the charge storage and transfer electrode (ST), and the reset gate (RS) are controlled via third control signals from the controller to reset an electric potential of the sensing node (SN), and wherein charge generated at each photodiode (PD) is transferred to the sensing node (SN) via the associated first charge transfer gate (Tx1), the charge storage and transfer electrode (ST), and the second charge transfer gate (Tx2).

According to this embodiment, the number of components such as transistors can be reduced as compared with embodiments without sharing of components among pixels. Further, an average pitch between pixels in a pixel array can be reduced.

According to a fourth implementation of the second aspect of the present application based on the third implementation of the second aspect of the present application, each group of photosensitive pixels comprises four photodiodes and four associated first charge transfer gates.

According to a fifth implementation of the second aspect of the present application based on the fourth implementation of the second aspect of the present application, the four photodiodes of each group of photosensitive pixels are arranged in a 2×2 array, wherein the first charge transfer gate (Tx) is arranged at a corner of each photodiode facing the center of the four photodiodes, and wherein the charge storage and transfer electrode is arranged at the center of the four photodiodes.

According to a third aspect of the present application, an image sensor is provided. An image sensor may comprise a pixel array and a readout circuit. According to a first implementation of the third aspect of the present application, for example, the image sensor may comprise the pixel array of any one implementation of the second aspect of the present application; and a readout circuit configured to read out signals from the photosensitive pixels from the pixel array. The readout circuit may comprise a vertical scanner for sequentially selecting rows of the array; a horizontal scanner; and an analog-digital conversion unit. In one specific readout implementation, (i) the analog-digital conversion unit converts, in parallel, analog signals from the photosensitive pixels of respective columns on a selected row, and the horizontal scanner sequentially selects digital values of respective columns for output. Alternatively, in another specific readout implementation, (ii) the horizontal scanner sequentially selects analog signals from photosensitive pixels of respective columns, and the analog-digital conversion unit performs analog-digital conversion on the sequentially selected analog signals.

According to a second implementation of the third aspect of the present application based on the first implementation of the third aspect of the present application, correlated double sampling (CDS) is performed, whereby a difference between a value obtained by the first signal-level AD conversion (ADs_H) and a value obtained by the first reset-level AD conversion (AD0_H) is used as a high-conversion-gain signal, and a difference between a value obtained by the second signal-level AD conversion (ADs_L) and a value obtained by the second reset-level AD conversion (AD0_L) is used as a low-conversion-gain signal.

According to a third implementation of the third aspect of the present application based on the first or second implementation of the third aspect of the present application, (A) all the photodiodes are reset and an accumulation period is started; (B) electric charge at the charge storage and transfer electrode (ST) at all the pixels is cleared; (C) the sensing nodes (SN) of all the pixels are reset; (D) a reset-level AD conversion (AD0_H) is performed for a first pixel row; the second charge transfer gate (Tx2) is turned on for the first pixel row so that signal charge in the charge storage and transfer electrode (ST) is transferred to the sensing node (SN), then the second charge transfer gate (Tx2) is turned off, and then a signal-level AD conversion (ADs_H) is performed for the first pixel row; (E) a reset-level AD conversion (AD0_H) is performed for a second pixel row; the second charge transfer gate (Tx2) is turned on for the second pixel row so that signal charge in the charge storage and transfer electrode (ST) is transferred to the sensing node (SN), then the second charge transfer gate (Tx2) is turned off, and then a signal-level AD conversion (ADs_H) is performed for the second pixel row.

According to this embodiment, exposure is completed in the steps (A), (B), and (C), and readout on each pixel row is performed subsequently. Since at least some of readout circuitry is shared among pixels along each vertical column, readout of the first pixel row and readout of the second pixel row do not occur concurrently, but sequentially. In a global shutter scheme in which exposure is performed for all the pixel rows simultaneously (as opposed to a rolling shutter scheme in which exposure is performed for pixel rows sequentially), the simultaneous exposure for the entire image frame provides an advantage in that there is no time difference among the pixel rows.

According to a fourth implementation of the third aspect of the present application based on the third implementation of the third aspect of the present application, correlated double sampling (CDS) is performed, wherein for each pixel row, a difference between a value obtained by a respective signal-level AD conversion (ADs_H) and a value obtained by a respective reset-level AD conversion is determined.

According to a fifth implementation of the third aspect of the present application based on any suitable one of the preceding implementations of the third aspect of the present application, the image sensor further comprises an overflow channel for discharging overflow electric charge from the photodiode to the drain.

In embodiments in which exposure is performed simultaneously for a plurality of pixel rows and readout is performed for the respective pixel rows sequentially thereafter, time may elapse from the exposure to readout. If electric charge accumulated at the photodiode flows over the first charge transfer gate (Tx1) in the off state to the charge storage and transfer electrode (ST), correct measurement cannot be made. The overflow channel (OFC) allows electric charge at the photodiode (PD) to flow to the drain before it overflows to the charge storage and transfer electrode (ST) over the first charge transfer gate despite its off state. Thus, the signal charge at the charge storage and transfer electrode (ST) is not destroyed. Thus, a global-shutter operation as well as a high conversion gain are achieved.

According to a fourth aspect of the present application, there is provided an electronic device comprising the image sensor according to any implementation of the third aspect of the present application.

According to a fifth aspect of the present application, there is provided a method of reading a signal from a photosensitive pixel or a pixel array. Such a method provides similar advantages to those provided by a corresponding photosensitive pixel, a corresponding pixel array, or a corresponding image sensor as described above. So, they are not repeated here for the sake of brevity.

The photosensitive pixel may comprise: a photodiode (PD) for generating photoelectrons; a first charge transfer gate (Tx1); a charge storage and transfer electrode (ST); a second charge transfer gate (Tx2); a sensing node (SN); a reset gate (RS) coupled to the charge storage and transfer electrode (ST); a drain (VD1) coupled to the reset gate; and an amplifier (AMP) coupled to the sensing node. According to a first implementation of the fifth aspect of the present application, the method comprises: (a) resetting the photodiode (PD) by clearing electric charge in the photodiode (PD); (b) turning off the first charge transfer gate (Tx1) to start charge accumulation at the photodiode; (c) accumulating signal charge at the photodiode (PD) during an accumulation period; (d) turning off the second charge transfer gate (Tx2) to reset the sensing node (SN); (e) turning off the charge storage and transfer electrode (ST) to clear electric charge at the charge storage and transfer electrode (ST) to the drain (VD1) via the reset gate (RS); (f1) turning off the reset gate (RS); (h2) turning on the charge storage and transfer electrode (ST); (i) turning on the first charge transfer gate (Tx1) so that the signal charge at the photodiode (PD) is transferred to the charge storage and transfer electrode (ST), turning off the first charge transfer gate (Tx1), and turning off the charge storage and transfer electrode (ST); and (j) turning on the second charge transfer gate (Tx2) so that signal charge at the charge storage and transfer electrode (ST) is transferred to the sensing node (SN), turning off the second charge transfer gate (Tx2), and performing, by the ADC, a first signal-level AD conversion (ADs_H) on an output of the amplifier coupled to the sensing node (SN).

This corresponds to an embodiment in which neither correlated double sampling (CDS) nor dual conversion gain (DCG) is required.

According to a second implementation of the fifth aspect of the present application based on the first implementation of the fifth aspect of the present application, the method further comprises, after the step of (f1) turning off the reset gate (RS); (f2) performing, by an analog-to-digital converter (ADC), a first reset-level analog-to-digital (AD) conversion (AD0_H) on an output of the amplifier coupled to the sensing node (SN).

This implementation accommodates correlated double sampling (CDS).

According to a third implementation of the fifth aspect of the present application based on the second implementation of the fifth aspect of the present application, the method further comprises, after (f2): (g) turning on the second charge transfer gate (Tx2) and performing, by the ADC, a second reset-level AD conversion (AD0_L) on an output of the amplifier coupled to the sensing node; and (h1) turning off the second charge transfer gate (Tx2), and the method further comprises, after (j), (k) turning on the second charge transfer gate (Tx2) and performing, by the ADC, a second signal-level AD conversion (ADs_L) on an output of the amplifier coupled to the sensing node.

This implementation accommodates correlated double sampling (CDS) as well as dual conversion gain (DCG).

According to a fourth implementation of the fifth aspect of the present application based on any suitable one of the preceding implementations of the fifth aspect of the present application, during the accumulation period, the second charge transfer gate (Tx2), the charge storage and transfer electrode (ST), and the reset gate (RS) are off.

According to a fifth implementation of the fifth aspect of the present application, there is provided a method of reading a signal from a photosensitive pixel comprising a photodiode (PD) for generating photoelectrons; a first charge transfer gate (Tx1); a charge storage and transfer electrode (ST); a second charge transfer gate (Tx2); a sensing node (SN); a reset gate (RS) coupled to the charge storage and transfer electrode (ST); a drain (VD1) coupled to the reset gate; and an amplifier (AMP) coupled to the sensing node, the method comprising: (a) resetting the photodiode (PD) by clearing electric charge in the photodiode (PD); (b) turning off the first charge transfer gate (Tx1) to start charge accumulation at the photodiode; (c) accumulating signal charge at the photodiode (PD) during an accumulation period; (d) turning off the second charge transfer gate (Tx2) to reset the sensing node (SN); (e) turning off the charge storage and transfer electrode (ST) to clear electric charge at the charge storage and transfer electrode (ST) to the drain (VD1) via the reset gate (RS); (f) turning off the reset gate (RS) and performing, by an analog-to-digital converter (ADC), a first reset-level analog-to-digital (AD) conversion (AD0_H) on an output of the amplifier coupled to the sensing node (SN); (g) turning on the reset gate (RS) and performing, by the ADC, a second reset-level AD conversion (AD0_L) on an output of the amplifier coupled to the sensing node; (h) turning off the second charge transfer gate (Tx2) and turning on the charge storage and transfer electrode (ST); (i') turning on the first charge transfer gate (Tx1) so that the signal charge at the photodiode (PD) is transferred to the charge storage and transfer electrode (ST), turning off the first charge transfer gate (Tx1); (j') turning on the second charge transfer gate (Tx2) and then turning off the charge storage and transfer electrode (ST) so that signal charge at the charge storage and transfer electrode (ST) is transferred to the second charge transfer gate (Tx2) and the sensing node (SN) and performing, by the ADC, a second signal-level AD conversion (ADs_L) on an output of the amplifier coupled to the sensing node (SN); and (k') turning off the second charge transfer gate (Tx2) and performing, by the ADC, a first signal-level AD conversion (ADs_H) on an output of the amplifier coupled to the sensing node.

According to a sixth implementation of the fifth aspect of the present application, there is provided a method of reading a signal from a pixel array comprising a plurality of groups of photosensitive pixels, each group of photosensitive pixels comprising: a plurality of photodiodes (PD) for generating photoelectrons; a plurality of first charge transfer gate (Tx1) associated with the plurality of photodiodes (PD) respectively; a shared charge storage and transfer electrode (ST); a shared second charge transfer gate (Tx2); a shared sensing node (SN); a shared reset gate (RS) coupled to the charge storage and transfer electrode (ST); a shared drain (VD1) coupled to the reset gate; and a shared amplifier (AMP) coupled to the sensing node, the method comprising performing readout from each pixel according to the method of any suitable one of the preceding implementations of the fifth aspect.

According to a seventh implementation of the fifth aspect of the present application, there is provided a method of reading a signal from a pixel array comprising a plurality of groups of photosensitive pixels, each group of photosensitive pixels comprising: a plurality of photodiodes (PD) for generating photoelectrons; a plurality of first charge transfer gate (Tx1) associated with the plurality of photodiodes (PD) respectively; a shared charge storage and transfer electrode (ST); a shared second charge transfer gate (Tx2); a shared sensing node (SN); a shared reset gate (RS) coupled to the charge storage and transfer electrode (ST); a shared drain (VD1) coupled to the reset gate; and a shared amplifier (AMP) coupled to the sensing node, the method comprising that: (A) all the photodiodes are reset and an accumulation period is started; (B) electric charge at the charge storage and transfer electrode (ST) at all the pixels is cleared; (C) the sensing nodes (SN) of all the pixels are reset; (D) a reset-level AD conversion (AD0_H) is performed for a first pixel row, the second charge transfer gate (Tx2) is turned on for the first pixel row so that signal charge in the charge storage and transfer electrode (ST) is transferred to the sensing node (SN), then the second charge transfer gate (Tx2) is turned off, and then a signal-level AD conversion (ADs_H) is performed for the first pixel row; (E) a reset-level AD conversion (AD0_H) is performed for a second pixel row; the second charge transfer gate (Tx2) is turned on for the second pixel row so that signal charge in the charge storage and transfer electrode (ST) is transferred to the sensing node (SN), then the second charge transfer gate (Tx2) is turned off, and then a signal-level AD conversion (ADs_H) is performed for the second pixel row.

This implementation provides a global shutter operation.

According to a sixth aspect of the present application, there is provided a computer program for causing a controller to perform the method of any suitable one of the implementations of the fifth aspect of the present application.

According to a seventh aspect of the present application, there is provided a computer-readable storage medium having stored thereon a computer program for causing a computer to perform the method of any suitable one of the implementations of the fifth aspect of the present application.

The foregoing concerns a first class of embodiments of the present application, in which a photosensitive pixel comprises a first charge transfer gate (Tx1), a charge storage and transfer electrode (ST), and a second charge transfer gate (Tx2).

According to second class of embodiments, the second charge transfer gate (Tx2) is eliminated.

According to an embodiment of the second class, a photosensitive pixel is provided, comprising: a photodiode (PD) for generating photoelectrons; a first charge transfer gate (Tx1); a charge storage and transfer electrode (ST); a sensing node (SN); a reset gate (RS) coupled to the charge storage and transfer electrode (ST); a drain (VD1) coupled to the reset gate; and an amplifier (AMP) coupled to the sensing node, wherein the first charge transfer gate (Tx1) is controlled via a first control signal from a controller to couple the photodiode (PD) to the charge storage and transfer electrode (ST) so as to allow charge transfer, wherein the charge storage and transfer electrode (ST) and the reset gate (RS) are controlled via second control signals from the controller to reset an electric potential of the sensing node (SN), and wherein charge generated at the photodiode (PD) is transferred to the sensing node (SN) via the first charge transfer gate (Tx1) and the charge storage and transfer electrode (ST).

According to another embodiment of the second class, the transfer of charge generated at the photodiode (PD) to the sensing node (SN) via the first charge transfer gate (Tx1), the charge storage and transfer electrode (ST) is implemented by steps of: (a) turning on the first charge transfer gate (Tx1) and resetting the photodiode (PD) by clearing electric charge in the photodiode (PD); (b) turning off the first charge transfer gate (Tx1) to start charge accumulation at the photodiode; (c) accumulating signal charge at the photodiode (PD) during an accumulation period; (e) turning off the charge storage and transfer electrode (ST) to clear electric charge at the charge storage and transfer electrode (ST) to the drain (VD1) via the reset gate (RS), and resetting the sensing node (SN); (f) turning off the reset gate (RS) to perform, by an analog-to-digital converter (ADC), a first reset-level analog-to-digital (AD) conversion (AD0_H) on an output of the amplifier coupled to the sensing node (SN); (g) turning on the charge storage and transfer electrode (ST) to perform, by the ADC, a second reset-level AD conversion (AD0_L) on an output of the amplifier coupled to the sensing node; (i) turning on the first charge transfer gate (Tx1) so that the signal charge at the photodiode (PD) is transferred to the charge storage and transfer electrode (ST), turning off the first charge transfer gate (Tx1), and turning off the charge storage and transfer electrode (ST) to perform, by the ADC, a first signal-level AD conversion (ADs_H) on an output of the amplifier coupled to the sensing node (SN); and (k) turning on the charge storage and transfer electrode (ST) to perform, by the ADC, a second signal-level AD conversion (ADs_L) on an output of the amplifier coupled to the sensing node.

Compared with the first class of embodiments, the second class of embodiments have less gates, which allows less complexity and smaller pixel size.

The second class of embodiments may be combined with any suitable features described in connection with the first class of embodiments. Details are not repeated for brevity's sake.

The foregoing describes a second class of embodiments of the present application, in which a photosensitive pixels comprises a first charge transfer gate (Tx1) and a charge storage and transfer electrode (ST), but not a second charge transfer gate (Tx2).

According to a third class of embodiments, the charge storage and transfer electrode (ST) is further eliminated.

According to an embodiment of the third class, a photosensitive pixel is provided, comprising: a photodiode (PD) for generating photoelectrons; a first charge transfer gate (Tx1); a sensing node (SN); a reset gate (RS) coupled to the first charge transfer gate (Tx1); a drain (VD1) coupled to the reset gate; and an amplifier (AMP) coupled to the sensing node, wherein the first charge transfer gate (Tx1) is controlled via a first control signal from a controller to couple the photodiode (PD) to the sensing node (SN) so as to allow charge transfer, wherein the first charge transfer gate (Tx1) and the reset gate (RS) are controlled via second control signals from the controller to reset an electric potential of the sensing node (SN), and wherein charge generated at the photodiode (PD) is transferred to the sensing node (SN) via the first charge transfer gate (Tx1).

According to another embodiment of the third class, the transfer of charge generated at the photodiode (PD) to the sensing node (SN) via the first charge transfer gate (Tx1) is implemented by steps of: (a) turning on the first charge transfer gate (Tx1) and resetting the photodiode (PD) by clearing electric charge in the photodiode (PD); (b) turning off the first charge transfer gate (Tx1) to start charge accumulation at the photodiode, and resetting the sensing node (SN); (c) accumulating signal charge at the photodiode (PD) during an accumulation period; (f) turning off the reset gate (RS) to perform, by an analog-to-digital converter (ADC), a first reset-level analog-to-digital (AD) conversion (AD0_H) on an output of the amplifier coupled to the sensing node (SN); (i) turning on and then off the first charge transfer gate (Tx1) so that the signal charge at the photodiode (PD) is transferred to the sensing node (SN) to perform, by the ADC, a first signal-level AD conversion (ADs_H) on an output of the amplifier coupled to the sensing node (SN).

Compared with the first and second classes of embodiments, the third class of embodiments allows even less complexity and smaller pixel size.

The third class of embodiments may be combined with any suitable features described in connection with the first class of embodiments. Details are not repeated for brevity's sake.

According to a generic class of embodiments, a photosensitive pixel is provided, comprising: a photodiode (PD) for generating photoelectrons; a group of gates; a sensing node (SN); a drain (VD1) coupled to the group of gates; an amplifier (AMP) coupled to the sensing node, wherein the group of gates are controlled via first control signals from a controller to couple the photodiode (PD) to the sensing node (SN) so as to allow charge transfer, wherein the group of gates are controlled via second control signals from the controller to reset an electric potential of the sensing node (SN).

It is to be understood that any feature described in connection with one aspect of the present disclosure may also be applicable to the other aspects as appropriate.

BRIEF DESCRIPTION OF DRAWINGS

To facilitate understanding of technical solutions in embodiments of the present application, references are made to the accompanying drawings, in which

FIG. 17 is a flowchart of a method for operating a photosensitive pixel in a manner accommodating CDS and DCG, according to an embodiment of the present application;

FIG. 18 is a flowchart of a method for operating a photosensitive pixel in a manner accommodating CDS but not DCG, according to an embodiment of the present application;

FIG. 19 is a flowchart of a method for operating a photosensitive pixel in a manner when neither CDS nor DCG is required, according to an embodiment of the present application;

FIG. 20 is a flowchart of a method for operating a photosensitive pixel, according to an embodiment of the present application;

FIG. 21 is a flowchart of a method for operating photosensitive pixels in different rows in a pixel array for a global shutter operation, according to an embodiment of the present application;

DESCRIPTION OF EMBODIMENTS

The following describes embodiments of the present application with reference to the accompanying drawings.

Figure 1:
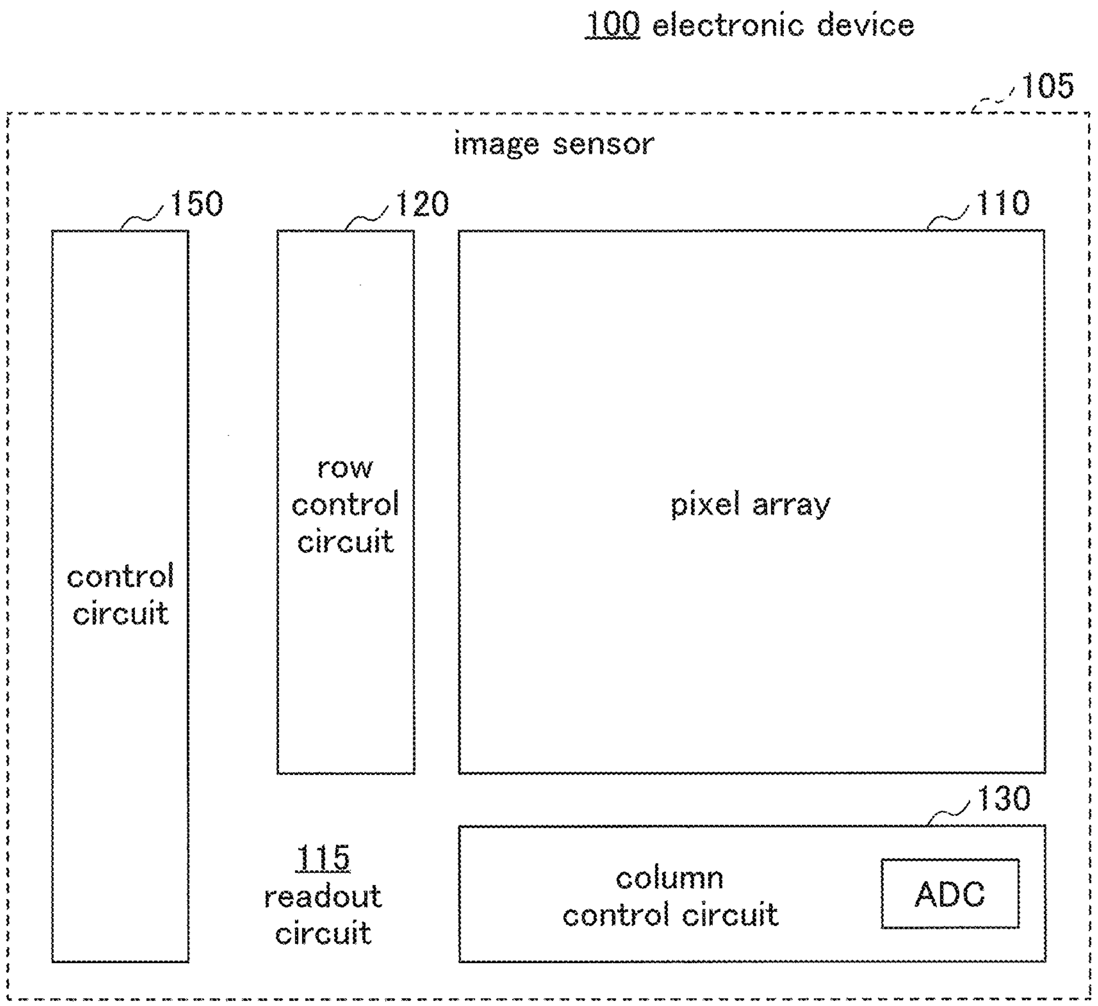
FIG. 1 is a schematic diagram of an image sensor in which a photosensitive pixel according to an embodiment of the present application may be applied.

FIG. 1 is a schematic diagram of an electronic device 100 that includes an image sensor 105. The image sensor 105 may include a pixel array 110 and a readout circuit 115 for taking out image signals from pixels. The readout circuit 115 includes a row control circuit 120, a column control circuit 130, and a control circuit 150.

An image signal corresponding to a pixel (cell) is generated by a photosensitive element (also referred to as a sensor element) of a photosensitive pixel (also referred to as a pixel sensor cell) and is read out by the readout circuit by rows and columns. A photosensitive element may be, but is not limited to, a photodiode. For example, a photoconductor film made of organic material can be used as a photosensitive element. Typically, in readout operations, a particular pixel row in the array may be selected by the row control circuit 120, and image signals generated by the pixels in that row are read out column by column along column lines by the column control circuit 130. An analog-to-digital conversion (ADC) circuit may be provided to convert image signals from pixels to digital values.

Figure 2:
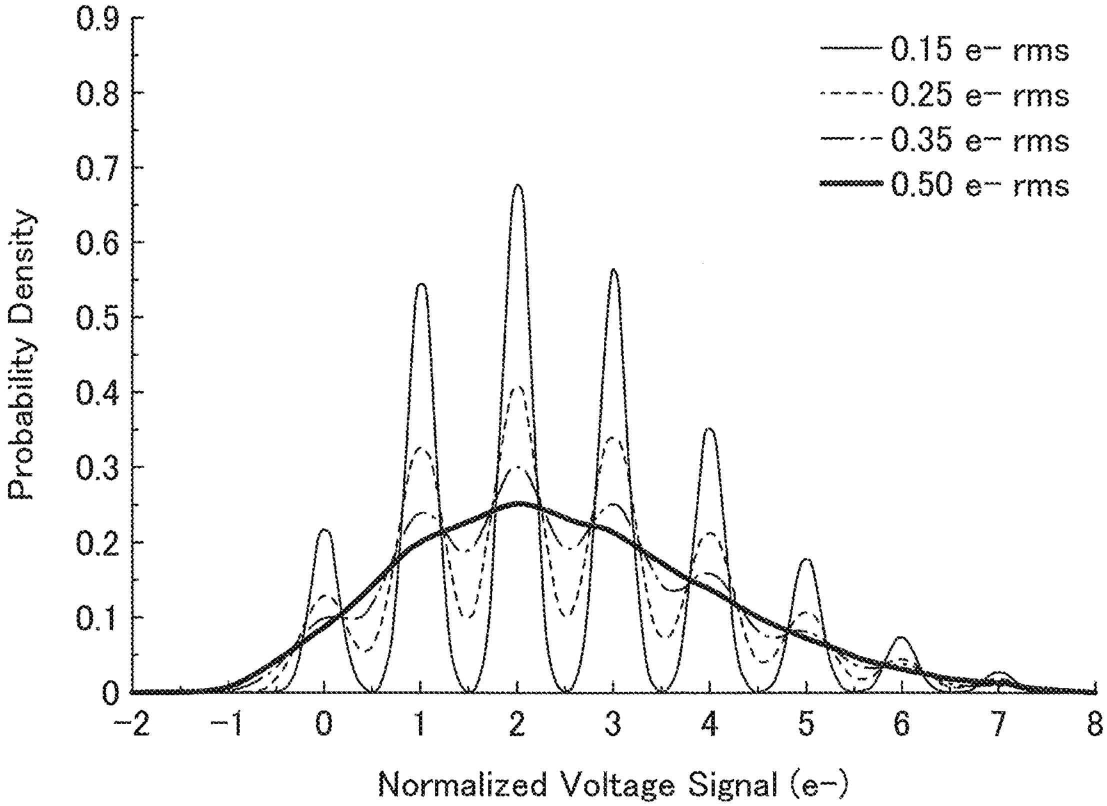
FIG. 2 is a photon counting histogram for pixels with different read noise values.

Photosensitive pixels known as a photon counting sensor can perform imaging at very low light level and can even count photoelectrons corresponding to individual photons. In order to count photoelectrons, the readout noise of the sensor should be lower than about 0.2e− rms. FIG. 2 illustrates a histogram of photon counts from a pixel (for multiple readouts from a single pixel or for readout of multiple pixels from a single exposure). It can be seen that for a readout noise of 0.15e− rms, voltage signals corresponding to no photoelectrons, one photoelectron, two photoelectrons, etc. can be clearly distinguished, while a readout noise as high as 0.50e− rms may not allow specifically identifying the number of photoelectrons.

Thus, it is desired to reduce readout noise. A key for reduction of readout noise is lowering the capacitance of the sensing node of the sensor. For the same quantity of photoelectrons produced by exposure to light, lower capacitance of the sensing node yields a larger voltage signal (that is, a higher conversion gain), which results in lower readout noise.

A first related technique for reducing capacitance of a sensing node of a photosensitive pixel (as illustrated in FIG.

3) employs a pump-gate architecture with vertical storage well (SW) and distal floating diffusion (FD). However, this requires a special pixel structure and process.

Figure 3:
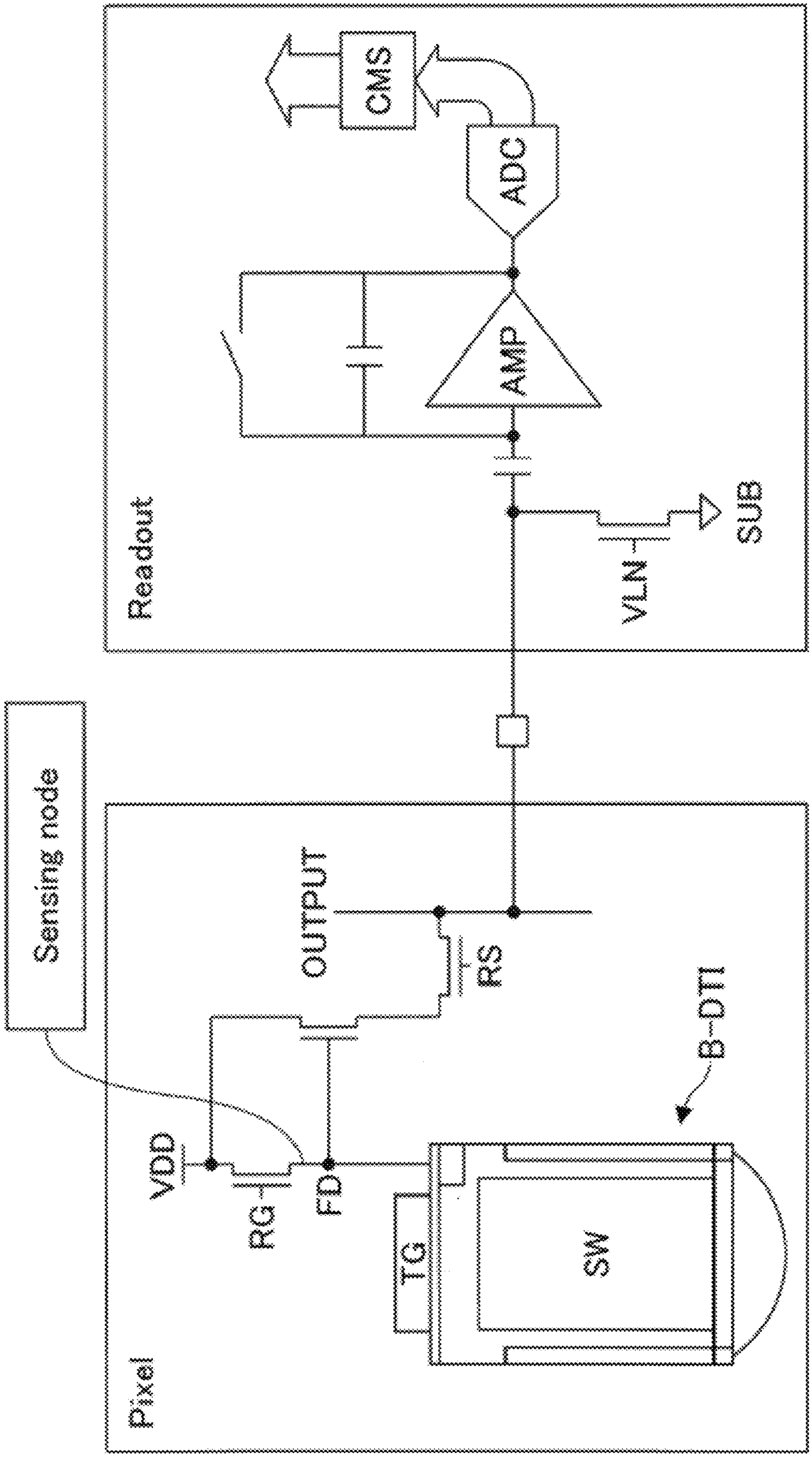
FIG. 3 illustrates a first related technique that may be employed to reduce sensor node capacitance.
Figure 4:
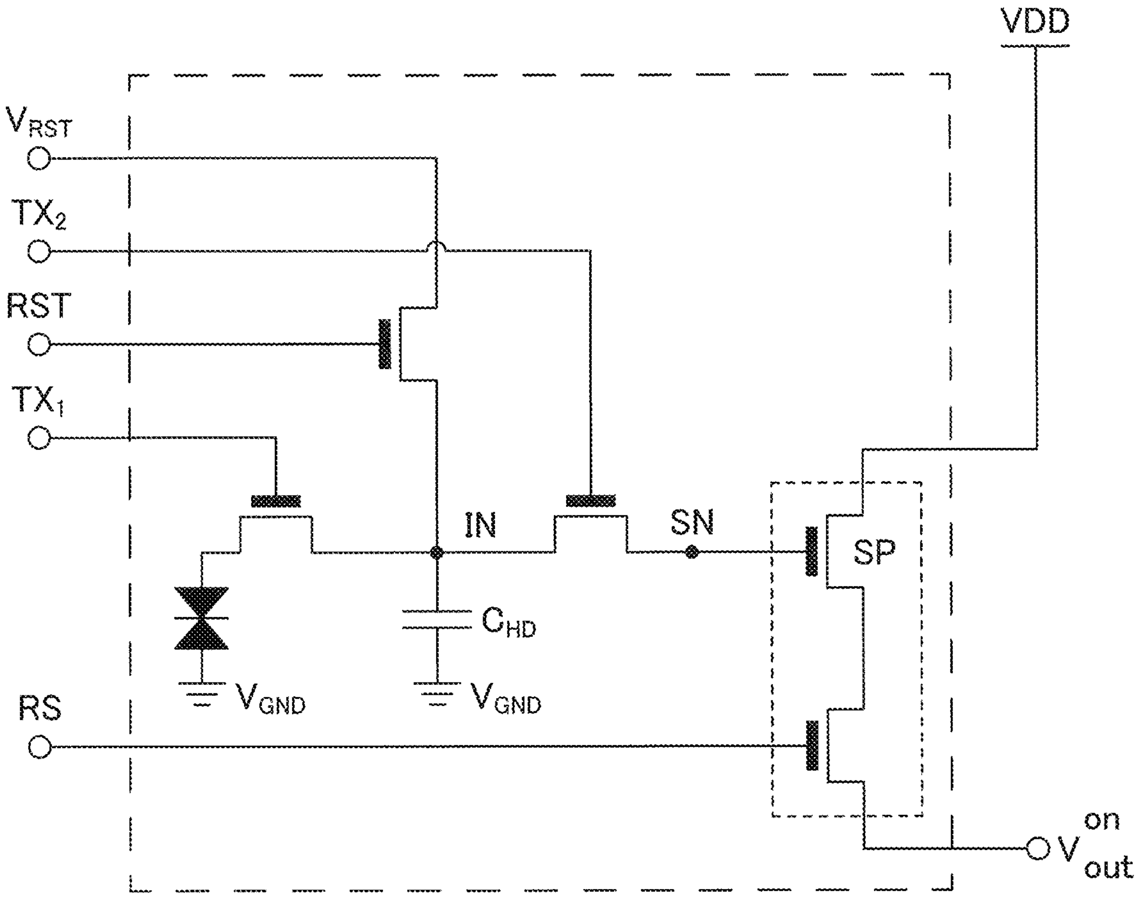
FIG. 4 illustrates a second related technique that may be employed to reduce sensor node capacitance.

A second related technique for reducing capacitance of a sensing node of a photosensitive pixel (as illustrated in FIG. 4) achieves reduction of capacitance of the sensing node by separating the sense node SN (also referred to as a drain node) from an intermediate node IN (also referred to as a source node), which is connected to a reset gate RST and into which photoelectrons generated by exposure to light flow. Unlike the related technique of FIG. 3, the related technique of FIG. 4 has an advantage in that it does not require a special pixel structure or process. However, there is a problem in that transfer of electric charge from the source node IN to the drain node SN is not a complete transfer. That is, part of photoelectrons generated by exposure to light remains in the intermediate node IN without being transferred to the sensing node SN. This results in issues such as increased noise and image lag. There is also an issue of longer conversion time.

Complete transfer of electric charge from the photodiode to the sensing node can be achieved by using a charge storage and transfer electrode (as opposed to a diffusion region without electrodes) in transferring charge from the photodiode to the sensing node.

Figure 5:
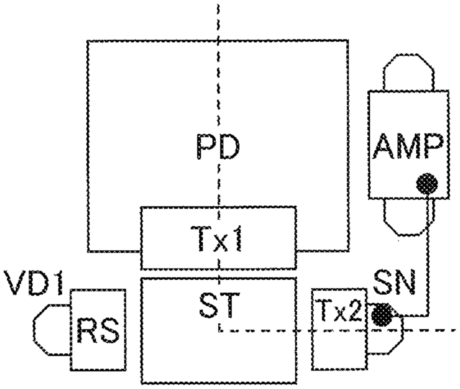
FIG. 5 is a schematic diagram of a photosensitive pixel according to an embodiment of the present application.

FIG. 5 illustrates a photosensitive pixel according to an embodiment of the present application.

A photodiode (PD) for generating photoelectrons is coupled to a charge storage and transfer electrode (ST) via a first charge transfer gate (Tx1), and the charge storage and transfer electrode (ST) is coupled to a sensing node (SN) via a second charge transfer gate (Tx2). The first charge transfer gate (Tx1) is controlled via a first control signal from a controller to couple the photodiode (PD) to the charge storage and transfer electrode (ST) so as to allow charge transfer. The second charge transfer gate (Tx2) is controlled via a second control signal from the controller to couple the charge storage and transfer electrode (ST) to the sensing node (SN) so as to allow charge transfer. Thus, electric charge generated at the photodiode (PD) is transferred to the sensing node (SN) via the first charge transfer gate (Tx1), the charge storage and transfer electrode (ST), and the second charge transfer gate (Tx2). An amplifier (AMP) is coupled to the sensing node. An analog-to-digital converter (ADC) performs analog-to-digital (AD) conversion on an output of the amplifier, so that electric charge accumulated at the sensing node (SN) can be detected as a voltage signal.

A reset gate (RS) is coupled to the charge storage and transfer electrode (ST), and a drain (VD1) is coupled to the reset gate (RS). The second transfer gate (Tx2), the charge storage and transfer electrode (ST), and the reset gate (RS) are controlled via third control signals from the controller to reset an electric potential of the sensing node (SN).

In order to transfer electric charge from the photodiode (PD) to the sensing node (SN), this embodiment of the present application provides a charge storage and transfer electrode (ST) (as opposed to a diffusion region that does not have an electrode). This allows the transfer of electric charge from the photodiode (PD) to the sensing node (SN) via the first charge transfer gate (Tx1), the charge storage and transfer electrode (ST), and the second charge transfer gate (Tx2) to be a complete transfer. This eliminates or mitigates issues arising due to incomplete transfer of charge, such as noise or image lag due to electric charge persistent (remaining) from a previously captured frame. Further, the charge transfer of this embodiment requires less time than transferring electric charge from a diffusion region to a sensing node via a charge transfer gate, and allows a shorter conversion period.

Further, since the only gate adjacent to the sensing node (SN) is the second charge transfer gate (Tx2), electrostatic capacitance of the sensing node (SN) can be made smaller, which results in a higher charge-voltage conversion efficiency. This is advantageous in applications including photon counting sensors.

Further, apart from providing the charge storage and transfer electrode (ST), no special pixel structure is required, and manufacturing is facilitated.

Further, combining capacitance of the second charge transfer gate (Tx2) with that of the sensing node (SN) can effectively increase the capacitance of the sensing node (SN). When the second charge transfer gate (Tx2) is off, the small capacitance of the sensing node (SN) allows a high conversion gain, which is suitable for detection in low light conditions. When the second charge transfer gate (Tx2) is on, the capacitance of the second charge transfer gate (Tx2) is combined with that of the sensing node (see, for example, (k) in FIG. 7 described below), which results in a large effective capacitance and a low conversion gain, which is suitable for detection in bright conditions. Using the high conversion gain and the low conversion gain as appropriate, a high dynamic range (HDR) can be achieved.

In some embodiments, the first charge transfer gate (Tx1), the second charge transfer gate (Tx2), the reset gate (RS), and/or the charge storage and transfer electrode (ST) are formed as MOSFET transistors.

Figure 6:
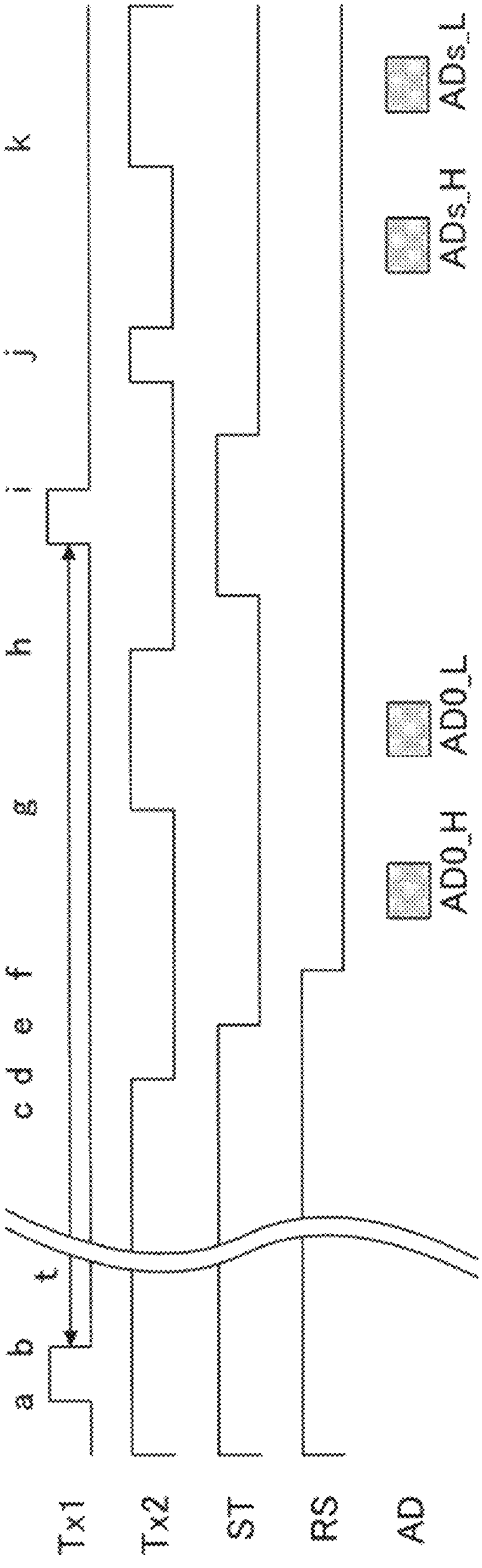
FIG. 6 is a timing chart of related control levels for operating a photosensitive pixel, according to an embodiment of the present application.

FIG. 6 is a timing chart according to an embodiment of the present application. The rows labelled Tx1 and Tx2 indicate on/off of control signals applied to the first charge transfer gate and the second charge transfer gate, respectively. (In the embodiment illustrated in FIG. 6, the upper level in the graph corresponds to "on", and the lower level corresponds to "off.") When "on", charge can pass through the gate. The row labelled ST indicates on/off of the voltage applied to the charge storage and transfer electrode. ("On" corresponds to a high voltage, and "off" corresponds to a low voltage.) The row labelled RS indicates on/off of a control signal applied to the reset gate.

Figure 7:
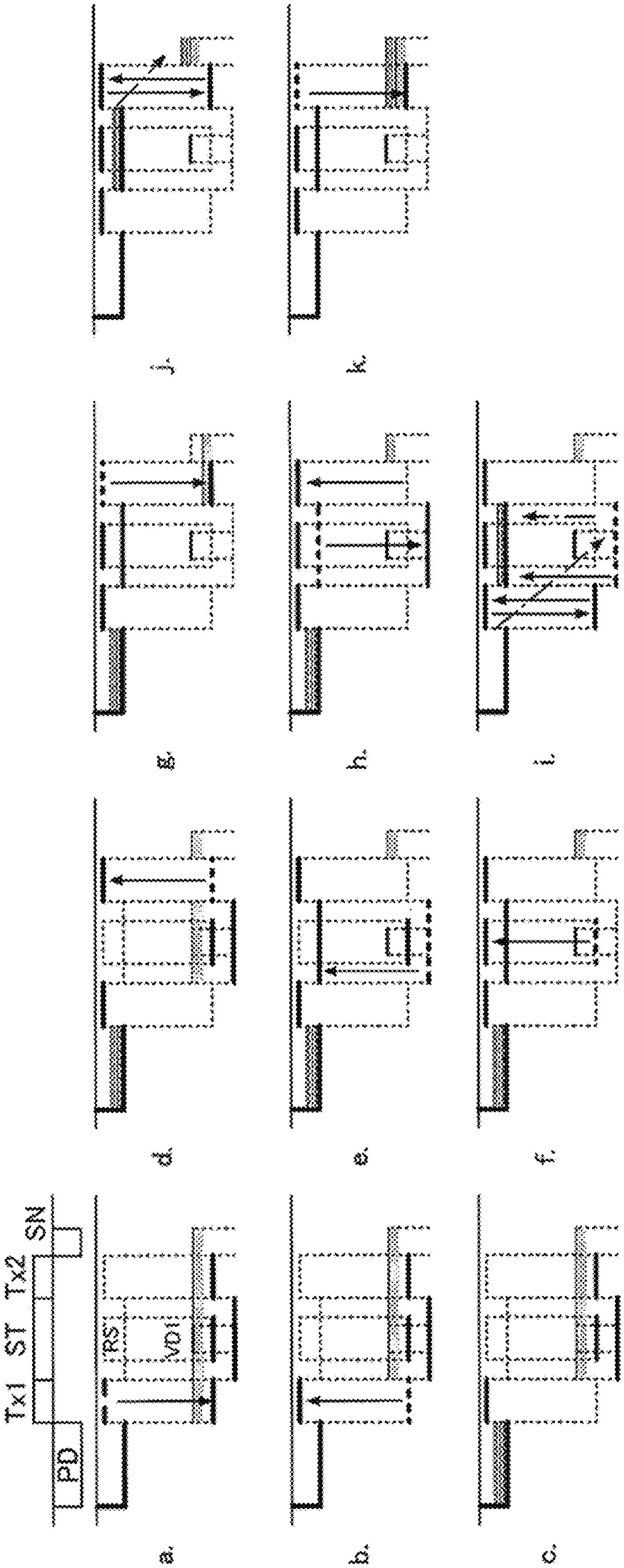
FIG. 7 illustrates potential diagrams for steps for operating a photosensitive pixel, according to an embodiment of the present application corresponding to FIG. 6.

FIG. 7 illustrates potential diagrams corresponding to the steps a-k in FIG. 6. In the potential diagrams, a lower level in the diagrams corresponds to a higher voltage and a higher level in the diagrams corresponds to a lower voltage. This means that the sign of potential is defined such that electrons move from a higher position to a lower position in the diagrams. A corresponding flowchart is shown in FIG. 17.

At (a), the photodiode (PD) is reset by clearing electric charge in the photodiode (PD). The potential diagram indicates the first charge transfer gate (Tx1) is on (that is, there is no barrier and charge is allowed to move), the charge storage and transfer electrode (ST) is on, the second charge transfer gate (Tx2) is on, and the reset gate (RS) is on. (In FIG. 6, the horizontal direction schematically indicates a path for electric charge from PD to Tx1, ST, Tx2, SN. The reset gate RS, which is outside of this path, overlaps ST in the illustration. Conceptually, RS may be regarded as located behind ST.) Potentials at the first charge transfer gate (Tx1), the charge storage and transfer electrode (ST), and the second charge transfer gate (Tx2) are at the same level (potential) as the drain VD1.

At (b), the first charge transfer gate (Tx1) is turned off (closed) to start charge accumulation (signal integration) at the photodiode (PD).

At (c), signal charge is accumulated at the photodiode (PD) during an accumulation period (integration period).

At (d), the second charge transfer gate (Tx2) is turned off (closed) to separate the sensing node (SN) from the charge storage and transfer electrode (ST). Thus, the sensing node (SN) now has a floating potential, and is ready for measurement of electric charge accumulated on the sensing node (SN). This process is referred to as resetting of the sensing node (SN).

At (e), the charge storage and transfer electrode (ST) is turned off (low voltage; upper level in the potential diagram), electric charge at the charge storage and transfer electrode (ST) is cleared (drained, dumped) to the drain (VD1) (supposed to be located behind the sheet of the drawing) via the reset gate (RS).

At (f), the reset gate (RS) is turned off. Under this condition, an analog-to-digital converter (ADC) performs a first reset-level analog-to-digital (AD) conversion (AD0_H) on an output of the amplifier coupled to the sensing node (SN). AD conversion is indicated in the row labelled AD in FIG. 6. Since electric charge from the photodiode (PD) has not been accumulated in the sensing node (SN), this is a reset-level measurement. This is used for correlated double sampling (CDS), in which a difference is taken between a signal-level measurement and this reset-level measurement. CDS is a technique that can cancel signal-independent noise such as kTC noise (thermal noise related to capacitance of the sensor circuit) by taking a difference between two measurements (samplings): an output when provided with a reset voltage ("reset-level") and an output when provided with a signal voltage ("signal-level").

At (g), the second charge transfer gate (Tx2) is turned on. Under this condition, the ADC performs a second reset-level AD conversion (AD0_L) on an output of the amplifier coupled to the sensing node.

The difference between the AD conversions in (f) and (g) is that a smaller conversion gain is achieved in (g) by turning on the second charge transfer gate (Tx2) to combine the capacitance of Tx2 with the capacitance of the sensing node (SN), thus effectively increasing the capacitance of the sensing node (SN). Thus, the AD conversion at step (f) (AD0_H) provides a reset-level detection at a higher conversion gain, while the AD conversion at step (g) (AD0_L) provides a reset-level detection at a lower conversion gain. Such a dual conversion gain (DCG) technique of performing detection with two conversion gains serves for achieving a high dynamic range (HDR) adapted for both dark and bright conditions.

At (h), the second charge transfer gate (Tx2) is turned off, and in preparation for charge transfer at the next step (i), the charge storage and transfer electrode (ST) is turned on (high voltage; lower level in the potential diagram).

At (i), the first charge transfer gate (Tx1) is turned on so that the signal charge at the photodiode (PD) is transferred to the charge storage and transfer electrode (ST), and then the first charge transfer gate (Tx1) is turned off. By using the charge storage and transfer electrode (ST) (as opposed to a mere diffusion region without electrodes), the charge transfer from the photodiode (PD) to the charge storage and transfer electrode (ST) is a complete transfer. In preparation for charge transfer at the next step (j), the charge storage and transfer electrode (ST) is turned off (low voltage; upper level in the potential diagram).

At (j), the second charge transfer gate (Tx2) is turned on, so that signal charge at the charge storage and transfer electrode (ST) is transferred to the sensing node (SN). The "off" state of the charge storage and transfer electrode (ST) ensures that the charge transfer from the charge storage and transfer electrode (ST) to the sensing node (SN) is a complete transfer. The second charge transfer gate (Tx2) is then turned off. Under this condition, the ADC performs a first signal-level AD conversion (ADs_H) on an output of the amplifier coupled to the sensing node (SN).

This AD conversion with the second charge transfer gate (Tx2) turned off as well as the AD conversion at step (f) also with the second charge transfer gate (Tx2) turned off are both associated with a higher conversion gain. Step (j) performs a signal-level measurement, while step (f) performs a reset-level measurement. These measurements are combined in CDS to provide a high-conversion-gain measurement with signal-independent noise removed.

As can be seen in steps (i) and (j), the "on" state of the charge storage and transfer electrode (ST) (high voltage; lower level in the potential diagram) allows storage of charge from the photodiode (PD) at the charge storage and transfer electrode (ST), while the "off" state of the charge storage and transfer electrode (ST) allows transfer of the charge stored at the charge storage and transfer electrode (ST) to the sensing node (SN). Thus, the charge storage and transfer electrode (ST) serves for storage and transfer of electric charge.

At (k), the second charge transfer gate (Tx2) is turned on. Under this condition, the ADC performs a second signal-level AD conversion (ADs_L) on an output of the amplifier coupled to the sensing node. With the second charge transfer gate (Tx2) turned on, the capacitance of the second charge transfer gate (Tx2) is combined with the capacitance of the sensing node (SN), thus effectively increasing the capacitance of the sensing node (SN), which yields a lower conversion gain.

This AD conversion with the second charge transfer gate (Tx2) turned on as well as the AD conversion at step (g) also with the second charge transfer gate (Tx2) turned on are both associated with a lower conversion gain. Step (k) performs a signal-level measurement, while step (g) performs a reset-level measurement. These measurements are combined in CDS to provide a low-conversion-gain measurement with signal-independent noise removed.

Combination of the high-conversion-gain measurement with signal-independent noise removed and the low-conversion-gain measurement with signal-independent noise removed provides a high dynamic range (HDR) in a dual conversion gain (DCG) technique.

As can be seen above, the photosensitive pixel according to this embodiment supports CDS for suppressing kTC noise and DCG for enlarging a dynamic range.

A first variant of the above embodiment without DCG is also contemplated. In this case, the AD conversions at the low conversion gain (AD0_L and ADs_L) need not be performed. The reset-level AD conversion (AD0_H) and the signal-level AD conversion (ADs_H) allows CDS. The control flow can be simplified as follows. (A corresponding flowchart is shown in FIG. 18.) The steps (a)-(f), (i), and (j) are the same as in the above embodiment supporting both DCG and CDS. (Hereinafter, consistent labelling of the steps may be used among different embodiments to facilitate comparison of different embodiments. Thus, the labelling may not be consecutive. For example, in this embodiment, there is no "step (g).")

The steps in this embodiment include:

(a) resetting the photodiode (PD) by clearing electric charge in the photodiode (PD);

(b) turning off the first charge transfer gate (Tx1) to start charge accumulation at the photodiode;

(c) accumulating signal charge at the photodiode (PD) during an accumulation period;

(d) turning off the second charge transfer gate (Tx2) to reset the sensing node (SN);

(e) turning off the charge storage and transfer electrode (ST) to clear electric charge at the charge storage and transfer electrode (ST) to the drain (VD1) via the reset gate (RS);

(f) turning off the reset gate (RS) and performing, by an analog-to-digital converter (ADC), a first reset-level analog-to-digital (AD) conversion (AD0_H) on an output of the amplifier coupled to the sensing node (SN);

(h') turning on the charge storage and transfer electrode (ST);

(i) turning on the first charge transfer gate (Tx1) so that the signal charge at the photodiode (PD) is transferred to the charge storage and transfer electrode (ST), turning off the first charge transfer gate (Tx1), and turning off the charge storage and transfer electrode (ST); and (j) turning on the second charge transfer gate (Tx2) so that signal charge at the charge storage and transfer electrode (ST) is transferred to the sensing node (SN), and turning off the second charge transfer gate (Tx2) and performing, by the ADC, a first signal-level AD conversion (ADs_H) on an output of the amplifier coupled to the sensing node (SN).

A second variant is also contemplated in which CDS as well as DCG is eliminated. The control flow can be simplified as follows. (A corresponding flowchart is shown in FIG. 19.) This differs from the first variant above in that no reset-level AD conversion (AD0_H) is performed in (f').

The steps in this embodiment include:

(a) resetting the photodiode (PD) by clearing electric charge in the photodiode (PD);

(b) turning off the first charge transfer gate (Tx1) to start charge accumulation at the photodiode;

(c) accumulating signal charge at the photodiode (PD) during an accumulation period;

(d) turning off the second charge transfer gate (Tx2) to reset the sensing node (SN);

(e) turning off the charge storage and transfer electrode (ST) to clear electric charge at the charge storage and transfer electrode (ST) to the drain (VD1) via the reset gate (RS);

(f') turning off the reset gate (RS);

(h') turning on the charge storage and transfer electrode (ST);

(i) turning on the first charge transfer gate (Tx1) so that the signal charge at the photodiode (PD) is transferred to the charge storage and transfer electrode (ST), turning off the first charge transfer gate (Tx1), and turning off the charge storage and transfer electrode (ST); and (j) turning on the second charge transfer gate (Tx2) so that signal charge at the charge storage and transfer electrode (ST) is transferred to the sensing node (SN), and turning off the second charge transfer gate (Tx2) and performing, by the ADC, a first signal-level AD conversion (ADs_H) on an output of the amplifier coupled to the sensing node (SN).

Figure 8:
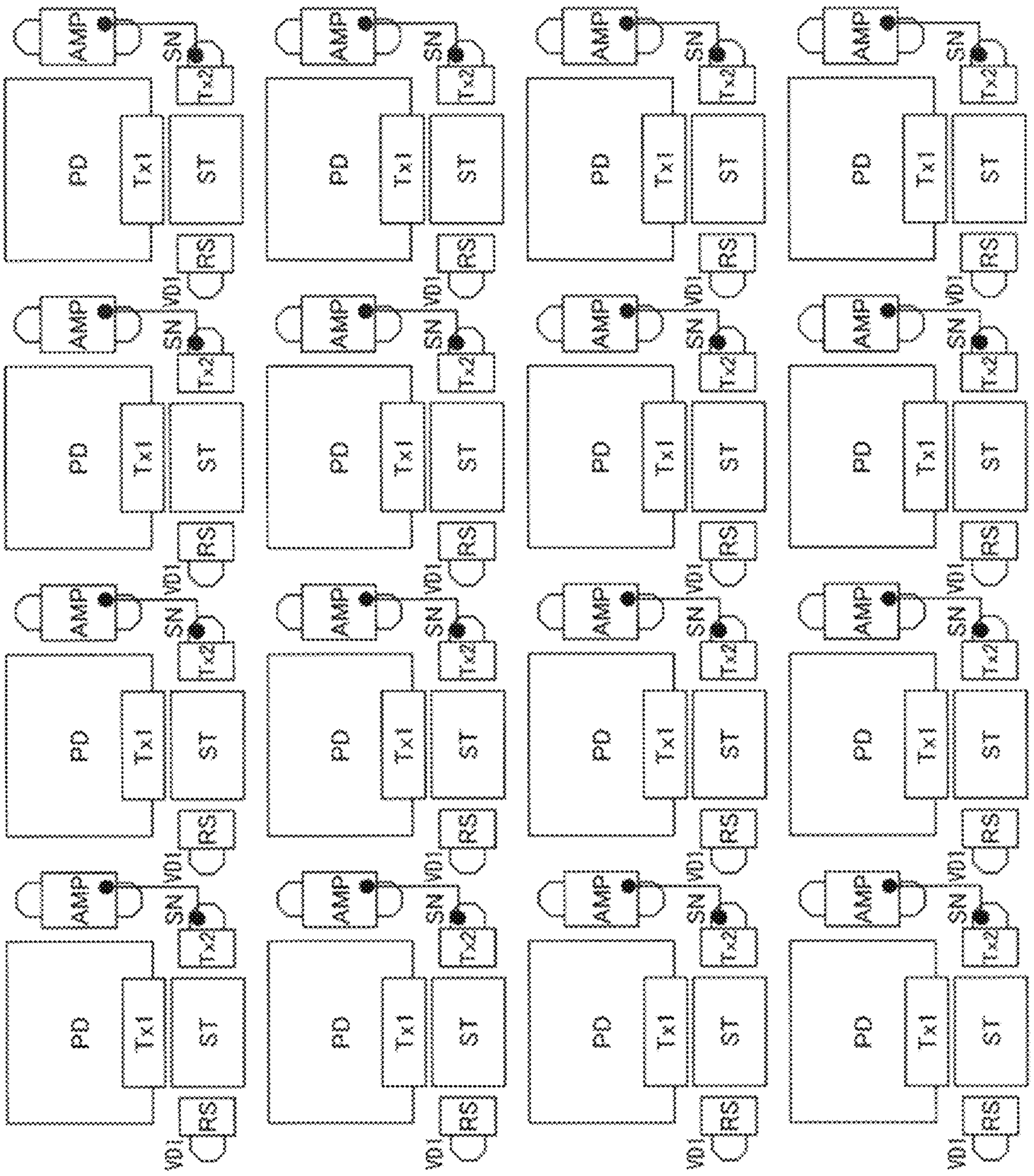
FIG. 8 illustrates a pixel array comprising photosensitive pixels according to an embodiment of the present application.

FIG. 8 illustrates a pixel array in which a plurality of photosensitive pixels according to the embodiment of FIG. 5 are arranged in a matrix. (The number of pixels is not limited to the example illustrated. Typically, there are much more pixels than the example illustrated.)

An image sensor comprises a pixel array and a readout circuit configured to read out signals from the photosensitive pixels from the pixel array. The readout circuit comprises a vertical scanner for sequentially selecting rows of the array; a horizontal scanner; and an analog-digital conversion (ADC) unit. Control for reading out detected values for individual pixels of the pixel array can be achieved in several manners, including a column-parallel approach and a sequential approach.

Figure 22:
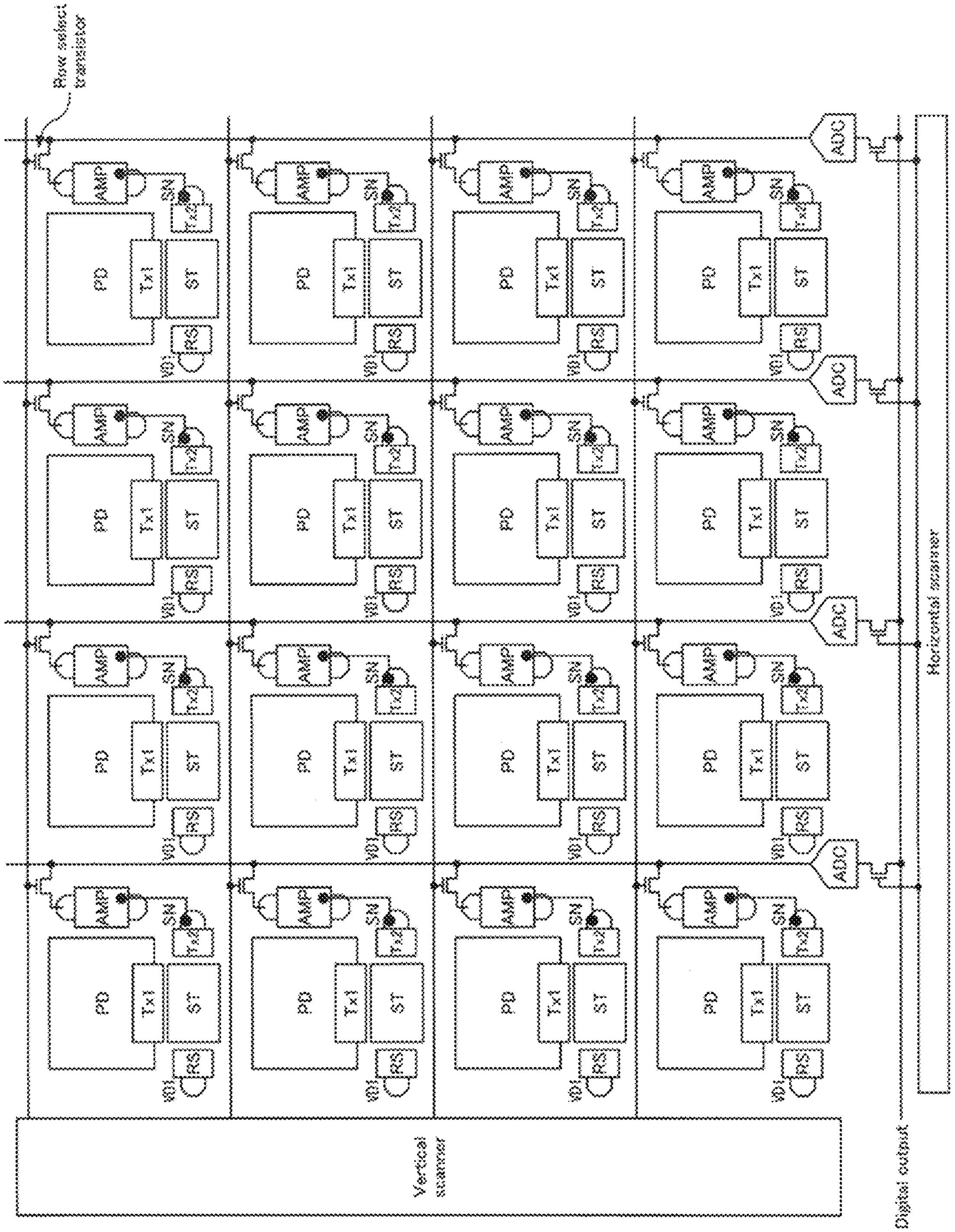
FIG. 22 illustrates a pixel array with readout circuitry according to an embodiment of the present application.

In the column-parallel approach (FIG. 22), the analog-digital conversion unit converts, in parallel, analog signals from the photosensitive pixels of respective columns on a selected row; and the horizontal scanner sequentially selects digital values of respective columns for output.

Figure 23:
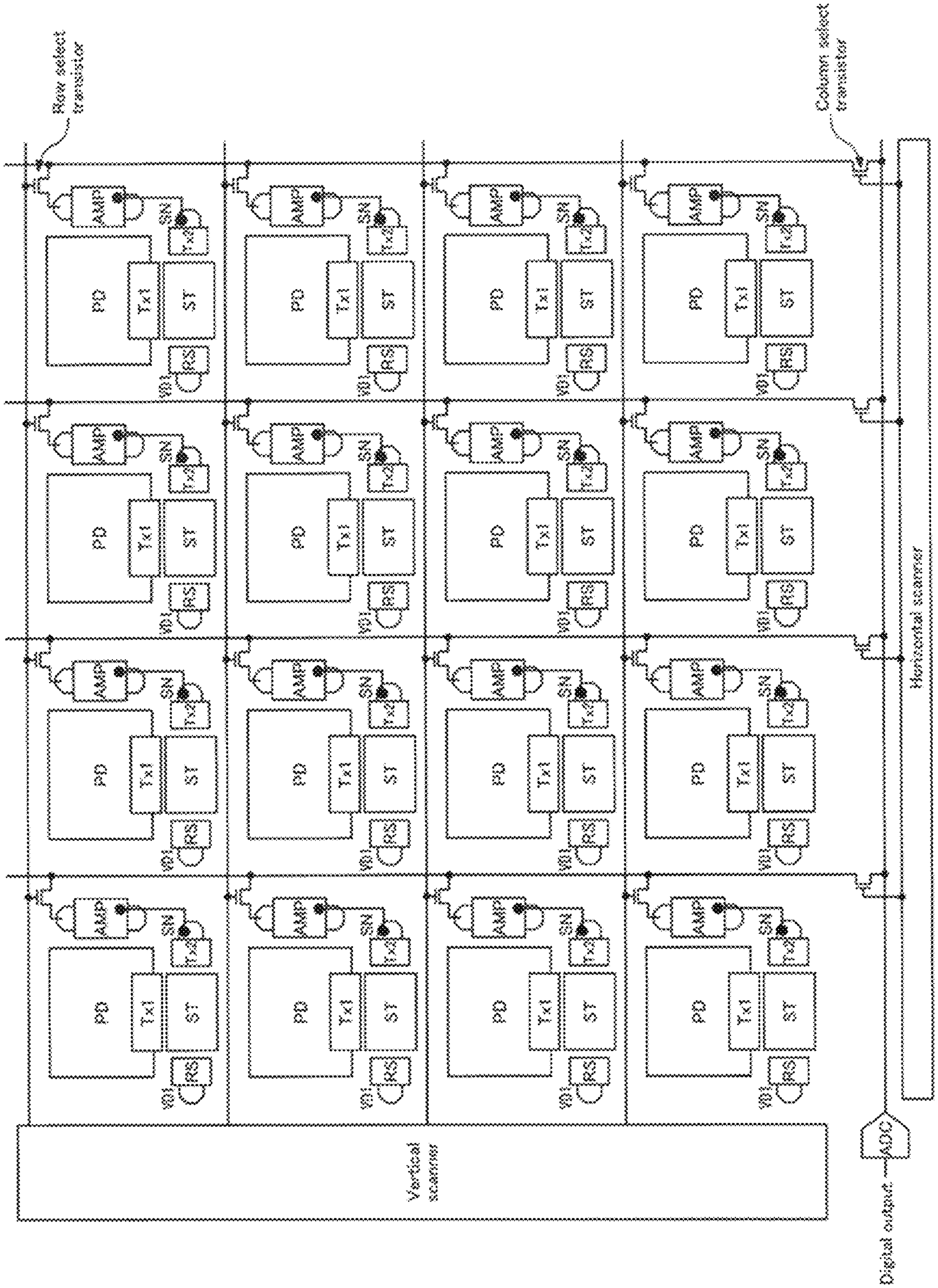
FIG. 23 illustrates a pixel array with readout circuitry according to an embodiment of the present application.

In the sequential approach (FIG. 23), the horizontal scanner sequentially selects analog signals from photosensitive pixels of respective columns, and the analog-digital conversion unit performs analog-digital conversion on the sequentially selected analog signals.

Figure 9:
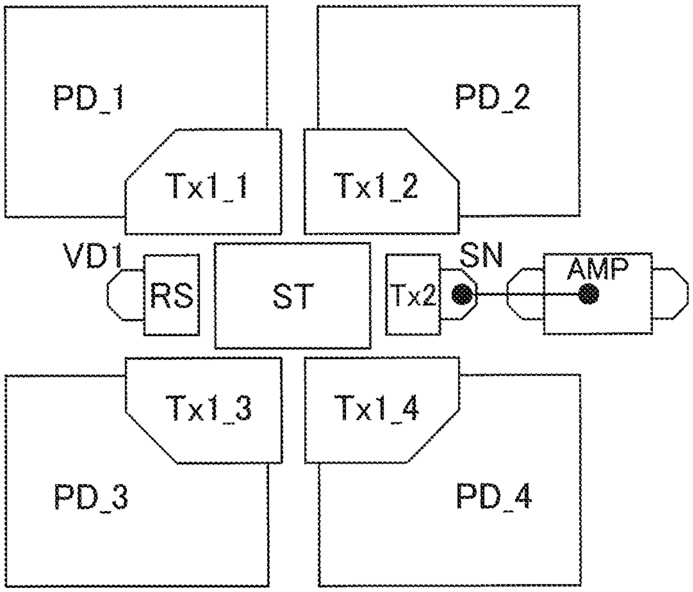
FIG. 9 illustrates a group of photosensitive pixels sharing some components, according to an embodiment of the present application.
Figure 10:
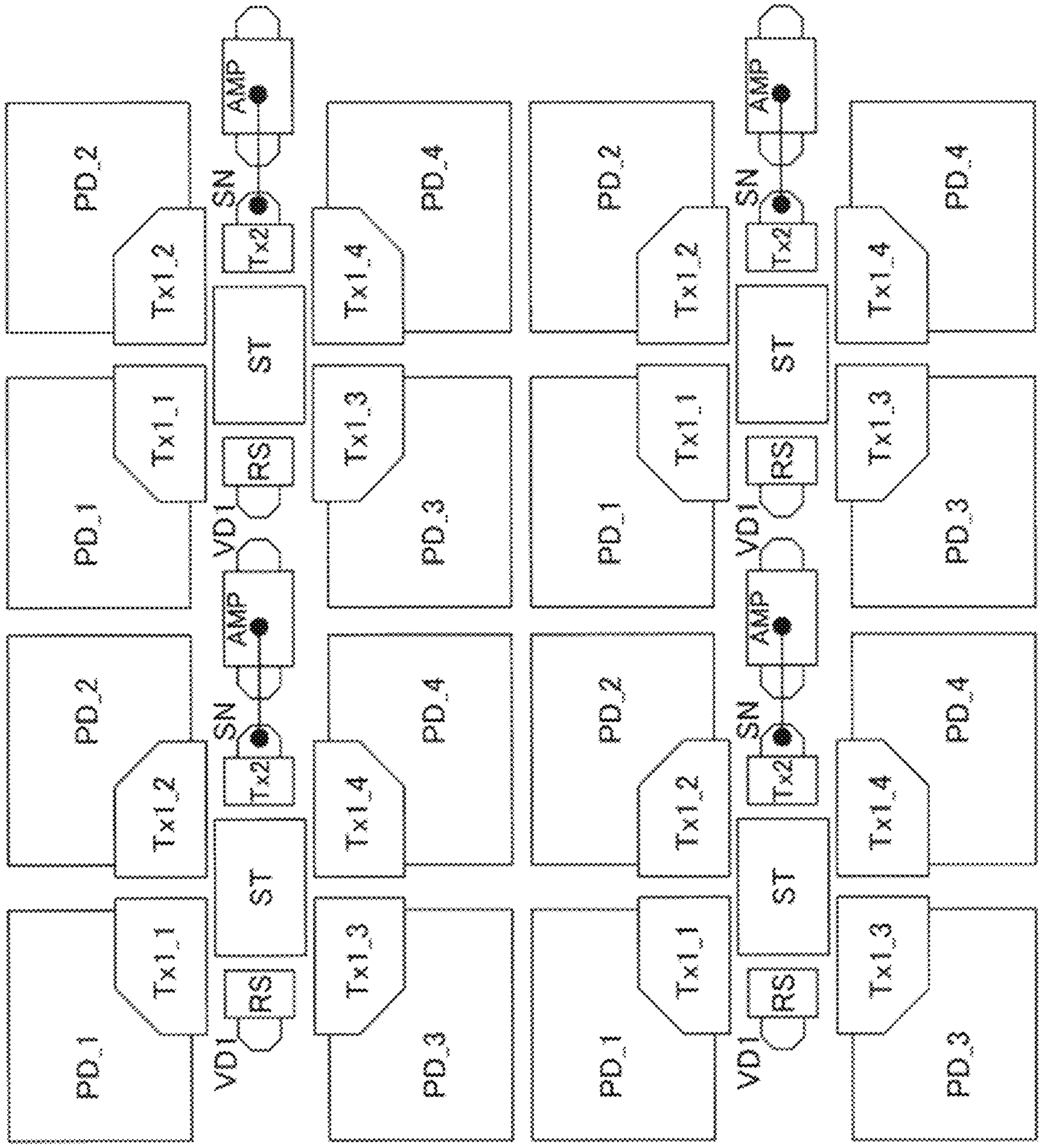
FIG. 10 illustrates a pixel array comprising groups of photosensitive pixels sharing some components, according to an embodiment of the present application.

In some embodiments, more than one photosensitive pixel may share the charge storage and transfer electrode (ST), the second charge transfer gate (Tx2), the reset gate (RS), the drain (VD1), and/or the amplifier (AMP). For example, in the example of FIG. 9, four pixels associated with four photodiodes (PD) have their own respective first charge transfer gates (Tx1), but share the charge storage and transfer electrode (ST), the second charge transfer gate (Tx2), the sensing node (SN), the reset gate (RS), the drain (VD1), and the amplifier (AMP). In the embodiment illustrated, the four photodiodes of each group of photosensitive pixels are arranged in a 2×2 array, wherein the first charge transfer gate (Tx) is arranged at a corner of each photodiode facing the center of the four photodiodes, and wherein the charge storage and transfer electrode (ST) is arranged at the center of the four photodiodes. FIG. 10 illustrates a matrix in which four such groups of four pixels are arranged. (The number of groups is not limited to the example illustrated. Typically, there are much more than the example illustrated.)

According to this embodiment, the number of components such as transistors can be reduced as compared with embodiments without sharing of components among pixels. Further, an average pitch between pixels in a pixel array can be reduced.

Figure 11:
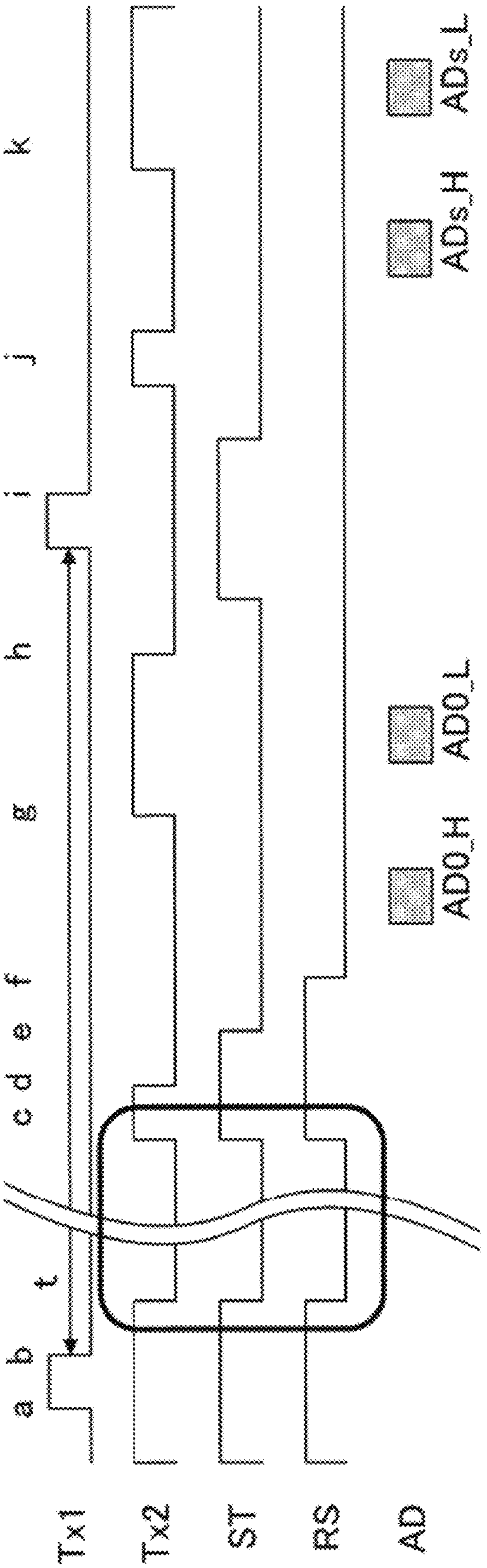
FIG. 11 is a timing chart of related control levels for operating a photosensitive pixel, according to an embodiment of the present application.

FIG. 11 illustrates a variant of the timing chart of FIG. 6 according to an embodiment of the present application. The difference from FIG. 6 is in that during the accumulation period, the second charge transfer gate (Tx2), the charge storage and transfer electrode (ST), and the reset gate (RS) are off. The longer duration when the second charge transfer gate (Tx2), the charge storage and transfer electrode (ST), and the reset gate (RS) are off may reduce voltage stress on the second charge transfer gate (Tx2), the charge storage and transfer electrode (ST), and the reset gate (RS), in particular on oxides thereof.

Figure 12:
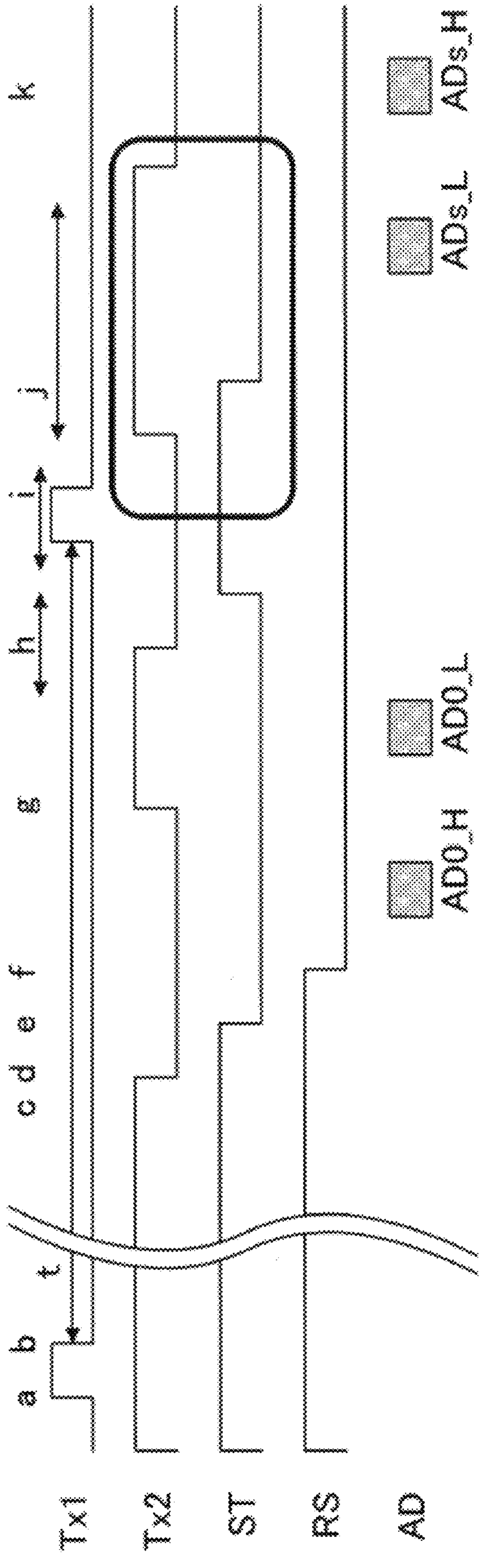
FIG. 12 is a timing chart of related control levels for operating a photosensitive pixel, according to an embodiment of the present application.
Figure 13:
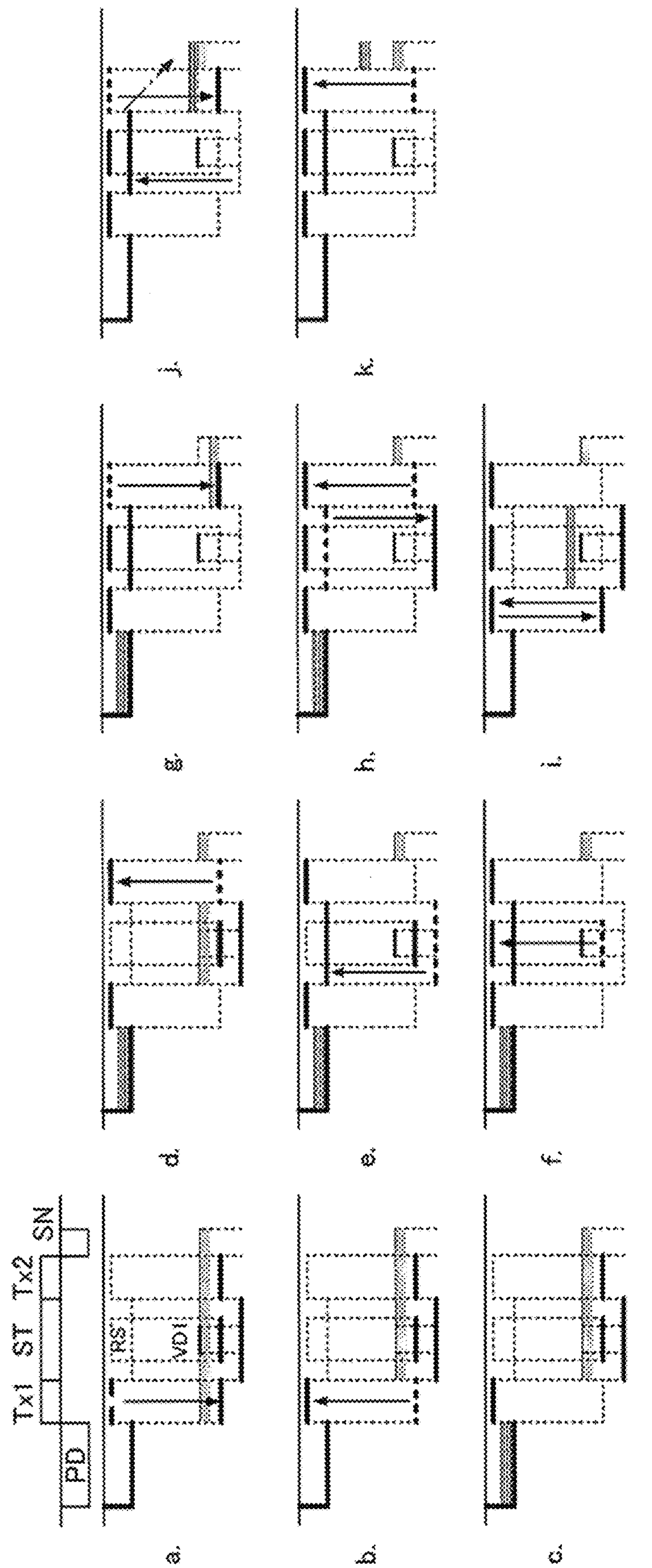
FIG. 13 illustrates potential diagrams for steps for operating a photosensitive pixel, according to an embodiment of the present application corresponding to FIG. 12.

FIG. 12 illustrates another variant of the timing chart of FIG. 6 according to an embodiment of the present application. FIG. 13 illustrates a corresponding potential diagrams. (A corresponding flowchart is shown in FIG. 20.) Steps (a)-(h) are the same as the corresponding steps in the embodiments as illustrated in FIG. 6 and FIG. 7.

The steps in this embodiment include:

(a) resetting the photodiode (PD) by clearing electric charge in the photodiode (PD);

(b) turning off the first charge transfer gate (Tx1) to start charge accumulation at the photodiode;

(c) accumulating signal charge at the photodiode (PD) during an accumulation period;

(d) turning off the second charge transfer gate (Tx2) to reset the sensing node (SN);

(e) turning off the charge storage and transfer electrode (ST) to clear electric charge at the charge storage and transfer electrode (ST) to the drain (VD1) via the reset gate (RS);

(f) turning off the reset gate (RS) and performing, by an analog-to-digital converter (ADC), a first reset-level analog-to-digital (AD) conversion (AD0_H) on an output of the amplifier coupled to the sensing node (SN);

(g) turning on the second charge transfer gate (Tx2) and performing, by the ADC, a second reset-level AD conversion (AD0_L) on an output of the amplifier coupled to the sensing node;

(h) turning off the second charge transfer gate (Tx2) and turning on the charge storage and transfer electrode (ST);

(i') turning on the first charge transfer gate (Tx1) so that the signal charge at the photodiode (PD) is transferred to the charge storage and transfer electrode (ST), turning off the first charge transfer gate (Tx1);

(j') turning on the second charge transfer gate (Tx2) and then turning off the charge storage and transfer electrode (ST) (i.e., the upper level in the potential diagram) so that signal charge at the charge storage and transfer electrode (ST) is transferred to the second charge transfer gate (Tx2) and the sensing node (SN) and performing, by the ADC, a second signal-level AD conversion (ADs_L) on an output of the amplifier coupled to the sensing node (SN); and (k') turning off the second charge transfer gate (Tx2) and performing, by the ADC, a first signal-level AD conversion (ADs_H) on an output of the amplifier coupled to the sensing node.

According to this embodiment, in step (i'), the charge storage and transfer electrode (ST) remains on after the first charge transfer gate (Tx1) is turned off. Since this results in a deeper level of the charge storage and transfer electrode (ST), more electric charge (than in the case of FIG. 7) is stored in step (i'), and more electric charge is transferred to the sensing node (SN) when the second charge transfer gate (Tx2) is turned on (i.e., the lower level in the potential diagram) in step (j').

Figure 14:
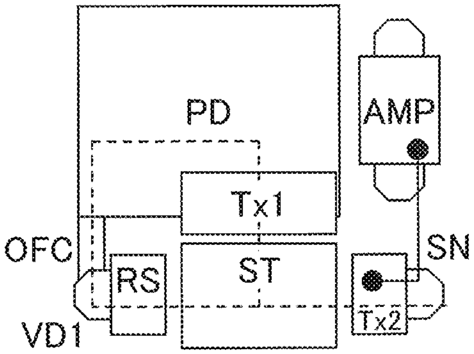
FIG. 14 is a schematic diagram of a photosensitive pixel according to an embodiment of the present application.

FIG. 14 illustrates a variant of a photosensitive pixel having an overflow channel (OFC) according to an embodiment of the present application. An overflow channel (OFC) allows overflow electric charge to flow out to the drain.

Figure 15:
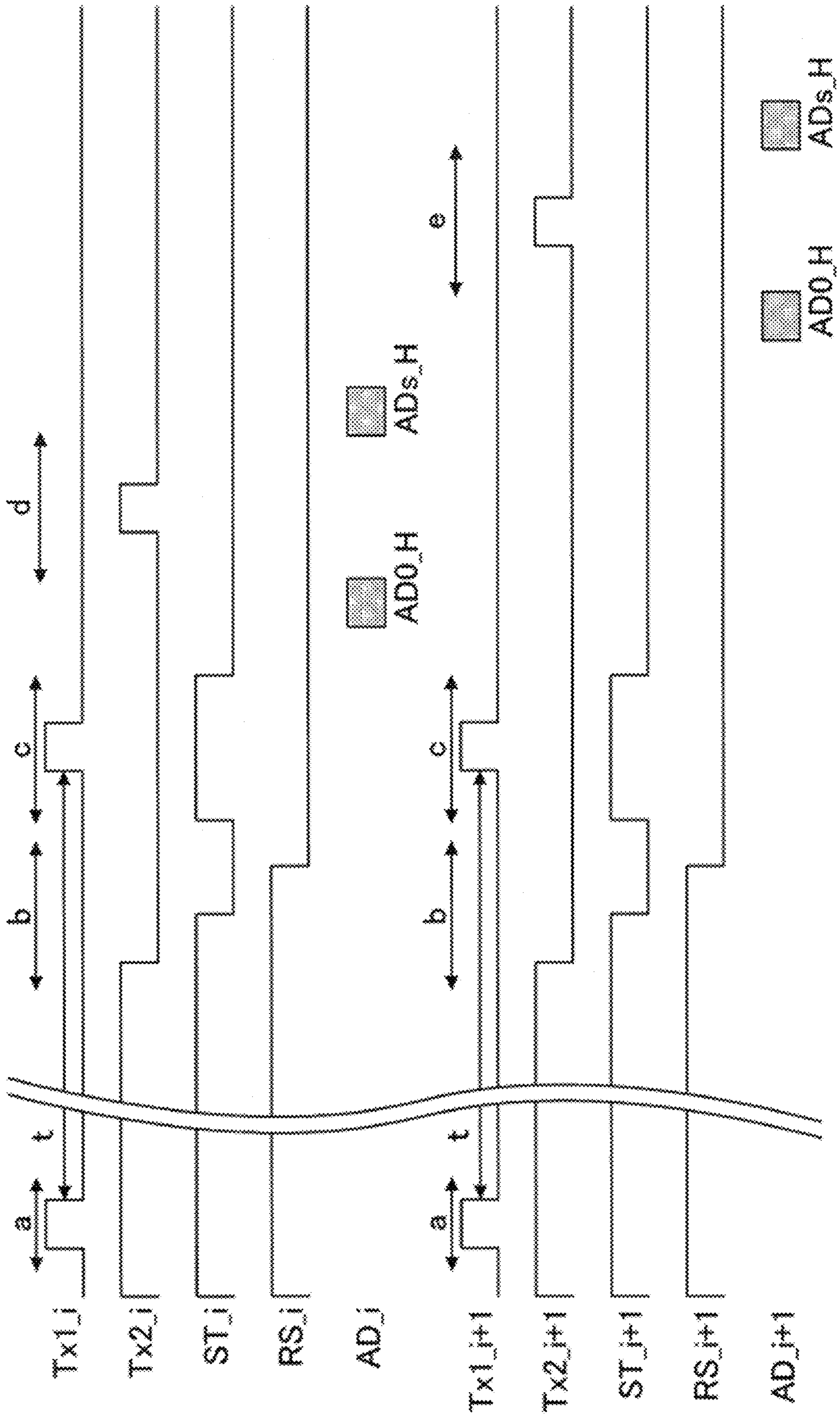
FIG. 15 is a timing chart of related control levels for operating a photosensitive pixel, according to an embodiment of the present application.
Figure 16:
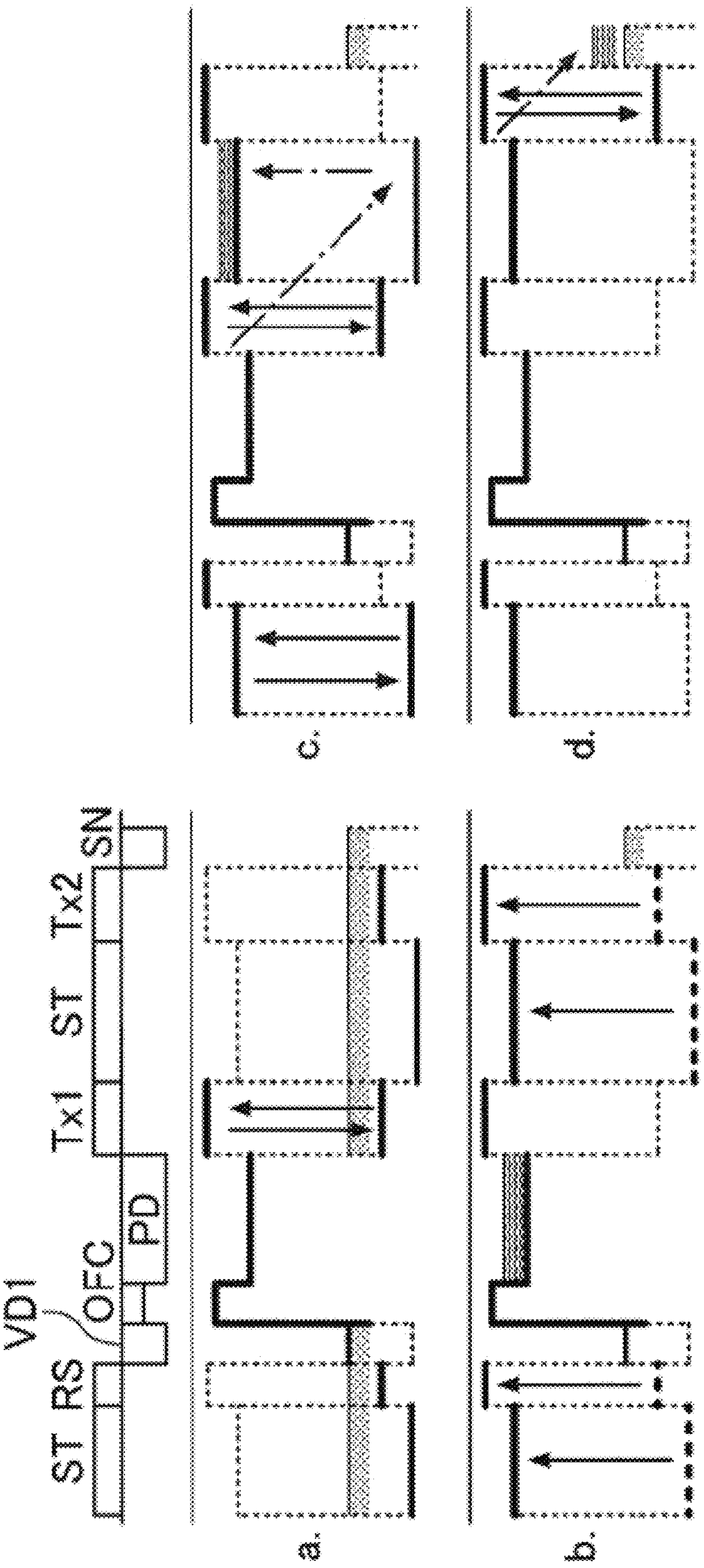
FIG. 16 illustrates potential diagrams for steps for operating a photosensitive pixel, according to an embodiment of the present application corresponding to FIG. 15.

FIG. 15 illustrates a timing chart of an embodiment with a global shutter feature, in which the overflow channel (OFC) of the embodiment of FIG. 14 may be useful. FIG. 16 illustrates a corresponding potential diagrams. (A corresponding flowchart is shown in FIG. 21.) It is noted that the embodiment of FIG. 15 and FIG. 16 involves AD conversions (AD0_H and ADs_H) for detection with high conversion gains, but AD conversions (AD0_L and ADs_L) for detection with low conversion gains as in the embodiment of FIG. 6 and FIG. 7 are not performed.

FIG. 15 illustrates timing charts for both pixel i and pixel i+1 on the next row. The operation for the pixel i is similar to that in FIG. 6, but exposure for imaging for the pixel i+1 is performed simultaneously with the pixel i ("global shutter").

In the potential diagrams in FIG. 16, unlike the potential diagrams in FIG. 7 and FIG. 13, the reset gate (RS) and the drain (VD1) are illustrated to the left of the photodiode (PD), and the charge storage and transfer electrode (ST) is illustrated in two places, in order to visually illustrate a charge flow from the photodiode (PD) for light detection to the first charge transfer gate (Tx1), the charge storage and transfer electrode (ST), the second charge transfer gate (Tx2), and the sensing node (SN); a charge flow from the photodiode (PD) to the drain (VD1) via the overflow channel (OFC); and a charge flow from the charge storage and transfer electrode (ST) to the drain (VD1) via the reset gate (RS).

The steps in this embodiment include the following.

At (a), the photodiode at every pixel is reset and an accumulation period (integration period) is started. This is similar to the step (a) of the embodiment illustrated with reference to FIG. 7. Thereafter, as with the step (b) and (c) of FIG. 7, the first charge transfer gate (Tx1) is turned off and charge accumulation at the photodiode (PD) is begun. In the timing chart of FIG. 15, the accumulation period is indicated by t.

At (b), electric charge at the charge storage and transfer electrode (ST) at every pixel is cleared, and the sensing node at every pixel is reset. This is similar to the steps (d) and (e) of the embodiment illustrated with reference to FIG. 7.

At (c), charge storage and transfer electrode (ST) is turned on; the first charge transfer gate (Tx1) is turned on, so that signal charge at the photodiode (PD) is transferred to the charge storage and transfer electrode (ST). Then, the first charge transfer gate (Tx1) is turned off, and the charge storage and transfer electrode (ST) is turned off. (The operations of the steps (a), (b), and (c) are performed simultaneously for all the photodiodes.) This is similar to the steps (h) and (i) of the embodiment illustrated with reference to FIG. 7 (except for changes in (h) due to omission of the second reset level AD conversion AD0_L).

At (d), a reset-level AD conversion (AD0_H) is performed for a first pixel row (i). This is similar to the step (f) of the embodiment illustrated with reference to FIG. 7. Further, the second charge transfer gate (Tx2) is turned on for the first pixel row (i) so that signal charge in the charge storage and transfer electrode (ST) is transferred to the sensing node (SN), then the second charge transfer gate (Tx2) is turned off, and then a signal-level AD conversion (ADs_H) is performed for the first pixel row (i).

At (e), a reset-level AD conversion (AD0_H) is performed for a second pixel row (i+1). Further, the second charge transfer gate (Tx2) is turned on for the second pixel row (i+1) so that signal charge in the charge storage and transfer electrode (ST) is transferred to the sensing node (SN), then the second charge transfer gate (Tx2) is turned off, and then a signal-level AD conversion (ADs_H) is performed for the second pixel row (i+1).

According to this embodiment, exposure to light for imaging is completed in the steps (a), (b), and (c), and readout on each pixel row is performed subsequently. Since at least some of readout circuitry is shared among pixels along each vertical column, readout of the first pixel row and readout of the second pixel row do not occur concurrently, but sequentially. In a global shutter scheme in which exposure is performed for all the pixel rows simultaneously (as opposed to a rolling shutter scheme in which exposure is performed for different pixel rows sequentially), simultaneous exposure for the entire image frame provides an advantage in that there is no time difference among the pixel rows.

Referring back to FIG. 14, there is provided an overflow channel (OFC) for allowing overflow charge from the photodiode (PD) to flow to the drain. In embodiments in which exposure is performed simultaneously for a plurality of pixel rows and readout is performed for the respective pixel rows sequentially thereafter, time may elapse from the exposure to readout. If electric charge accumulated at the photodiode flows over the first charge transfer gate Tx1 in the off state to the charge storage and transfer electrode ST, correct measurement cannot be made. The overflow channel (OFC) allows electric charge at the photodiode (PD) flow to the drain before it overflows to the charge storage and transfer electrode (ST) over the first charge transfer gate despite its off state. Thus, the signal charge at the charge storage and transfer electrode (ST) is not destroyed.

Thus, the global shutter operation is applicable in an embodiment of the present application which achieves high conversion gains by decreasing the capacitance of the sensing node (SN).

The foregoing describes a first class of embodiments of the present application, in which a photosensitive pixels comprises a first charge transfer gate (Tx1), a charge storage and transfer electrode (ST), and a second charge transfer gate (Tx2). The following describes a second class of embodiments in which the second charge transfer gate (Tx2) is eliminated. This class of embodiments have less gates, which allows less complexity and smaller pixel size.

Figure 24:
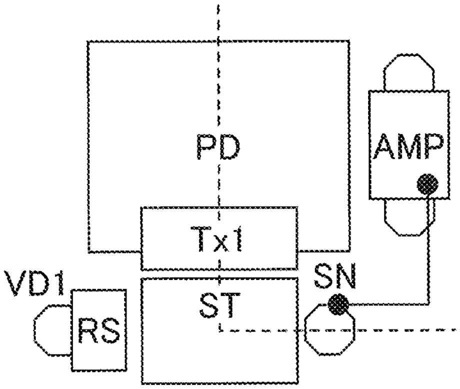
FIG. 24 is a schematic diagram of a photosensitive pixel according to an embodiment of a second class of the present application.

FIG. 24 illustrates a photosensitive pixel according to an embodiment of the present application. The photosensitive pixel of FIG. 24 is similar to the photosensitive pixel of FIG. 5, except that there is no second charge transfer gate (Tx2).

A photodiode (PD) for generating photoelectrons is coupled to a charge storage and transfer electrode (ST) via a first charge transfer gate (Tx1), and the charge storage and transfer electrode (ST) is coupled to a sensing node (SN). The first charge transfer gate (Tx1) is controlled via a first control signal from a controller to couple the photodiode (PD) to the charge storage and transfer electrode (ST) so as to allow charge transfer. The charge storage and transfer electrode (ST) is controlled via a second control signal from the controller to couple the charge storage and transfer electrode (ST) to the sensing node (SN) so as to allow charge transfer. Thus, electric charge generated at the photodiode (PD) is transferred to the sensing node (SN) via the first charge transfer gate (Tx1) and the charge storage and transfer electrode (ST). An amplifier (AMP) is coupled to the sensing node. An analog-to-digital converter (ADC) performs analog-to-digital (AD) conversion on an output of the amplifier, so that electric charge accumulated at the sensing node (SN) can be detected as a voltage signal.

A reset gate (RS) is coupled to the charge storage and transfer electrode (ST), and a drain (VD1) is coupled to the reset gate (RS). The charge storage and transfer electrode (ST) and the reset gate (RS) are controlled via third control signals from the controller to reset an electric potential of the sensing node (SN).

In order to transfer electric charge from the photodiode (PD) to the sensing node (SN), this embodiment of the present application provides a charge storage and transfer electrode (ST) (as opposed to a diffusion region that does not have an electrode). This allows the transfer of electric charge from the photodiode (PD) to the sensing node (SN) via the first charge transfer gate (Tx1) and the charge storage and transfer electrode (ST) to be a complete transfer. This eliminates or mitigates issues arising due to incomplete transfer of charge, such as noise or image lag due to electric charge persistent (remaining) from a previously captured frame. Further, the charge transfer of this embodiment requires less time than transferring electric charge from a diffusion region to a sensing node via a charge transfer gate, and allows a shorter conversion period.

Further, since the only gate adjacent to the sensing node (SN) is the charge storage and transfer electrode (ST), electrostatic capacitance of the sensing node (SN) can be made smaller, which results in a higher charge-voltage conversion efficiency. This is advantageous in applications including photon counting sensors.

Further, apart from providing the charge storage and transfer electrode (ST), no special pixel structure is required, and manufacturing is facilitated.

Further, combining capacitance of the charge storage and transfer electrode (ST) with that of the sensing node (SN) can effectively increase the capacitance of the sensing node (SN). When the charge storage and transfer electrode (ST) is off, the small capacitance of the sensing node (SN) allows a high conversion gain, which is suitable for detection in low light conditions. When the charge storage and transfer electrode (ST) is on, the capacitance of the charge storage and transfer electrode (ST) is combined with that of the sensing node (see, for example, (k) in FIG. 26 described below), which results in a large effective capacitance and a low conversion gain, which is suitable for detection in bright conditions. Using the high conversion gain and the low conversion gain as appropriate, a high dynamic range (HDR) can be achieved.

In some embodiments, the first charge transfer gate (Tx1), the reset gate (RS), and/or the charge storage and transfer electrode (ST) are formed as MOSFET transistors.

Figure 25:
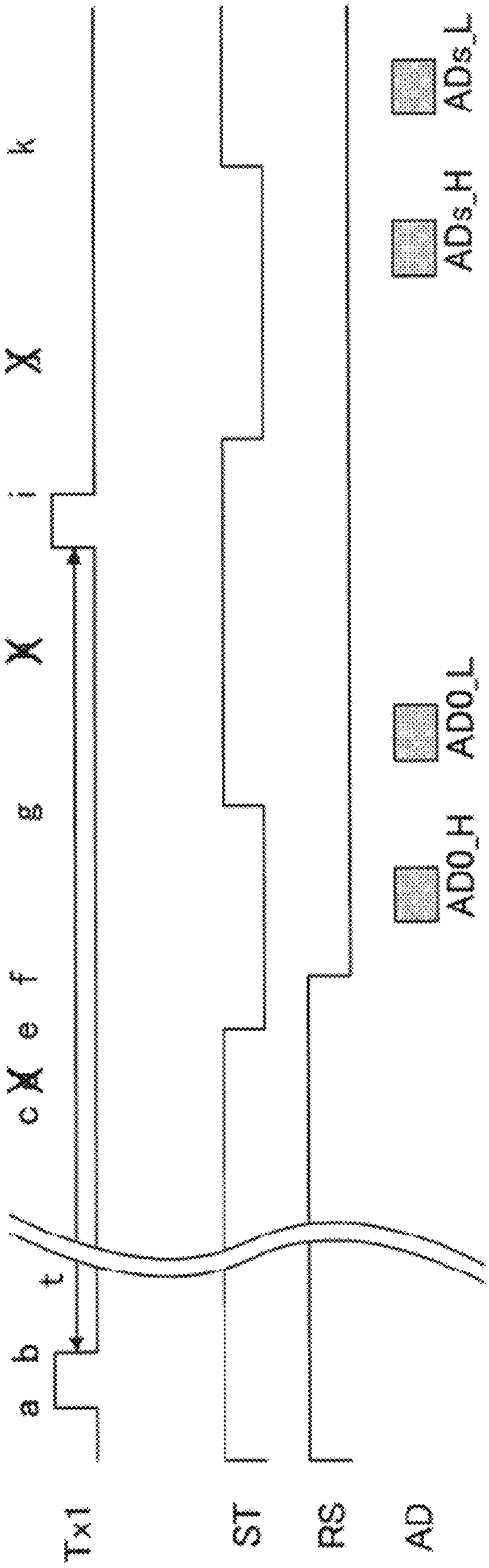
FIG. 25 is a timing chart of related control levels for operating a photosensitive pixel, according to an embodiment of the second class of the present application.

FIG. 25 is a timing chart according to an embodiment of the present application. (Although transitions at steps d, h, and j of FIG. 6 are not present in this embodiment, the labels d, h, and j crossed out with an X sign are shown to facilitate spotting the difference from FIG. 6.) The row labelled Tx1 indicates on/off of control signals applied to the first charge transfer gate. (In the embodiment illustrated in FIG. 25, the upper level in the graph corresponds to "on", and the lower level corresponds to "off.") When "on", charge can pass through the gate. The row labelled ST indicates on/off of the voltage applied to the charge storage and transfer electrode. ("On" corresponds to a high voltage, and "off" corresponds to a low voltage.) The row labelled RS indicates on/off of a control signal applied to the reset gate.

Figure 26:
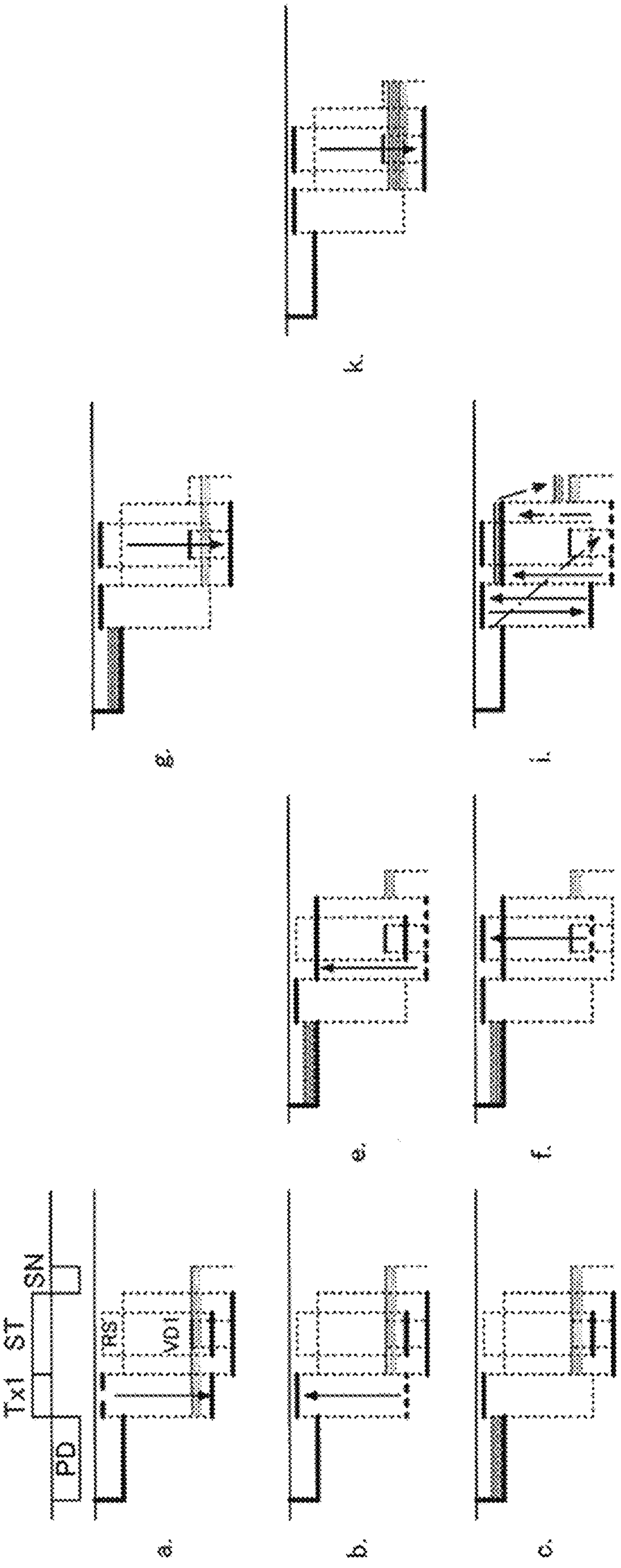
FIG. 26 illustrates potential diagrams for steps for operating a photosensitive pixel, according to an embodiment of the second class of the present application corresponding to FIG. 25.

FIG. 26 illustrates potential diagrams corresponding to the steps a-k in FIG. 25. In the potential diagrams, a lower level in the diagrams corresponds to a higher voltage and a higher level in the diagrams corresponds to a lower voltage. This means that the sign of potential is defined such that electrons move from a higher position to a lower position in the diagrams.

At (a), the photodiode (PD) is reset by clearing electric charge in the photodiode (PD). The potential diagram indicates the first charge transfer gate (Tx1) is on (that is, there is no barrier and charge is allowed to move), the charge storage and transfer electrode (ST) is on and the reset gate (RS) is on. (In FIG. 26, the horizontal direction schematically indicates a path for electric charge from PD to Tx1, ST, SN. The reset gate RS, which is outside of this path, overlaps ST in the illustration. Conceptually, RS may be regarded as located behind ST.) Potentials at the first charge transfer gate (Tx1) and the charge storage and transfer electrode (ST) are at the same level (potential) as the drain VD1.

At (b), the first charge transfer gate (Tx1) is turned off (closed) to start charge accumulation (signal integration) at the photodiode (PD).

At (c), signal charge is accumulated at the photodiode (PD) during an accumulation period (integration period).

At (e), the charge storage and transfer electrode (ST) is turned off (low voltage; upper level in the potential diagram) to separate the sensing node (SN) from the charge storage and transfer electrode (ST). Thus, the sensing node (SN) now has a floating potential, and is ready for measurement of electric charge accumulated on the sensing node (SN).

This process is referred to as resetting of the sensing node (SN), and electric charge at the charge storage and transfer electrode (ST) is cleared (drained, dumped) to the drain (VD1) (supposed to be located behind the sheet of the drawing) via the reset gate (RS).

At (f), the reset gate (RS) is turned off. Under this condition, an analog-to-digital converter (ADC) performs a first reset-level analog-to-digital (AD) conversion (AD0_H) on an output of the amplifier coupled to the sensing node (SN). AD conversion is indicated in the row labelled AD in FIG. 25. Since electric charge from the photodiode (PD) has not been accumulated in the sensing node (SN), this is a reset-level measurement. This is used for correlated double sampling (CDS), in which a difference is taken between a signal-level measurement and this reset-level measurement. CDS is a technique that can cancel signal-independent noise such as kTC noise (thermal noise related to capacitance of the sensor circuit) by taking a difference between two measurements (samplings): an output when provided with a reset voltage ("reset-level") and an output when provided with a signal voltage ("signal-level").

At (g), the charge storage and transfer electrode (ST) is turned on. Under this condition, the ADC performs a second reset-level AD conversion (AD0_L) on an output of the amplifier coupled to the sensing node.

The difference between the AD conversions in (f) and (g) is that a smaller conversion gain is achieved in (g) by turning on the charge storage and transfer electrode (ST) to combine the capacitance of ST with the capacitance of the sensing node (SN), thus effectively increasing the capacitance of the sensing node (SN). Thus, the AD conversion at step (f) (AD0_H) provides a reset-level detection at a higher conversion gain, while the AD conversion at step (g) (AD0_L) provides a reset-level detection at a lower conversion gain. Such a dual conversion gain (DCG) technique of performing detection with two conversion gains serves for achieving a high dynamic range (HDR) adapted for both dark and bright conditions.

At (i), the first charge transfer gate (Tx1) is turned on so that the signal charge at the photodiode (PD) is transferred to the charge storage and transfer electrode (ST), and then the first charge transfer gate (Tx1) is turned off. By using the charge storage and transfer electrode (ST) (as opposed to a mere diffusion region without electrodes), the charge transfer from the photodiode (PD) to the charge storage and transfer electrode (ST) is a complete transfer. And then, the charge storage and transfer electrode (ST) is turned off (low voltage; upper level in the potential diagram) so that signal charge at the charge storage and transfer electrode (ST) is transferred to the sensing node (SN). Under this condition, the ADC performs a first signal-level AD conversion (ADs_H) on an output of the amplifier coupled to the sensing node (SN).

This AD conversion with the charge storage and transfer electrode (ST) turned off as well as the AD conversion at step (f) also with the charge storage and transfer electrode (ST) turned off are both associated with a higher conversion gain. Step (i) performs a signal-level measurement, while step (f) performs a reset-level measurement. These measurements are combined in CDS to provide a high-conversion-gain measurement with signal-independent noise removed.

As can be seen in step (i), the "on" state of the charge storage and transfer electrode (ST) (high voltage; lower level in the potential diagram) allows storage of charge from the photodiode (PD) at the charge storage and transfer electrode (ST), while the "off" state of the charge storage and transfer electrode (ST) allows transfer of the charge stored at the charge storage and transfer electrode (ST) to the sensing node (SN). Thus, the charge storage and transfer electrode (ST) serves for storage and transfer of electric charge.

At (k), the charge storage and transfer electrode (ST) is turned on. Under this condition, the ADC performs a second signal-level AD conversion (ADs_L) on an output of the amplifier coupled to the sensing node. With the charge storage and transfer electrode (ST) turned on, the capacitance of the charge storage and transfer electrode (ST) is combined with the capacitance of the sensing node (SN), thus effectively increasing the capacitance of the sensing node (SN), which yields a lower conversion gain.

This AD conversion with the charge storage and transfer electrode (ST) turned on as well as the AD conversion at step (g) also with the charge storage and transfer electrode (ST) turned on are both associated with a lower conversion gain. Step (k) performs a signal-level measurement, while step (g) performs a reset-level measurement. These measurements are combined in CDS to provide a low-conversion-gain measurement with signal-independent noise removed.

Combination of the high-conversion-gain measurement with signal-independent noise removed and the low-conversion-gain measurement with signal-independent noise removed provides a high dynamic range (HDR) in a dual conversion gain (DCG) technique.

As can be seen above, the photosensitive pixel according to this embodiment supports CDS for suppressing kTC noise and DCG for enlarging a dynamic range.

The second class of embodiments may be combined with any suitable features described in connection with the first class of embodiments. Details are not repeated for brevity's sake.

The foregoing describes a second class of embodiments of the present application, in which a photosensitive pixels comprises a first charge transfer gate (Tx1) and a charge storage and transfer electrode (ST), but not a second charge transfer gate (Tx2). The following describes a third class of embodiments in which the charge storage and transfer electrode (ST) is further eliminated. This class of embodiments allows even less complexity and smaller pixel size.

Figure 27:
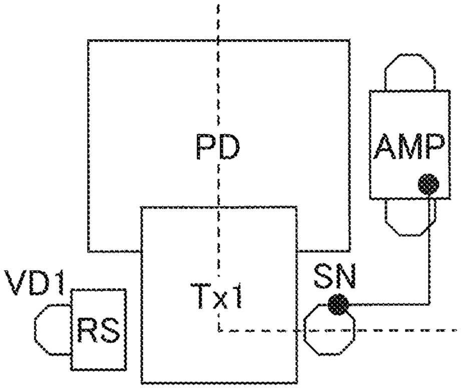
FIG. 27 is a schematic diagram of a photosensitive pixel according to an embodiment of a third class of the present application.

FIG. 27 illustrates a photosensitive pixel according to an embodiment of the present application. The photosensitive pixel of FIG. 27 is similar to the photosensitive pixels of FIG. 5 and FIG. 24, except that there is no second charge transfer gate (Tx2) and no charge storage and transfer electrode (ST).

A photodiode (PD) for generating photoelectrons is coupled to a sensing node (SN) via the first charge transfer gate (Tx1). The first charge transfer gate (Tx1) is controlled via a first control signal from a controller to couple the photodiode (PD) to the sensing node (SN) so as to allow charge transfer. Thus, electric charge generated at the photodiode (PD) is transferred to the sensing node (SN) via the first charge transfer gate (Tx1). An amplifier (AMP) is coupled to the sensing node. An analog-to-digital converter (ADC) performs analog-to-digital (AD) conversion on an output of the amplifier, so that electric charge accumulated at the sensing node (SN) can be detected as a voltage signal.

A reset gate (RS) is coupled to the first charge transfer gate (Tx1), and a drain (VD1) is coupled to the reset gate (RS). The first charge transfer gate (Tx1) and the reset gate (RS) are controlled via second control signals from the controller to reset an electric potential of the sensing node (SN).

In order to transfer electric charge from the photodiode (PD) to the sensing node (SN), this embodiment of the present application provides a first charge transfer gate (Tx1) (as opposed to a diffusion region that does not have an electrode). This allows the transfer of electric charge from the photodiode (PD) to the sensing node (SN) via the first charge transfer gate (Tx1) to be a complete transfer. This eliminates or mitigates issues arising due to incomplete transfer of charge, such as noise or image lag due to electric charge persistent (remaining) from a previously captured frame. Further, the charge transfer of this embodiment requires less time than transferring electric charge from a diffusion region to a sensing node via a charge transfer gate, and allows a shorter conversion period.

Further, since the only gate adjacent to the sensing node (SN) is the first charge transfer gate (Tx1), electrostatic capacitance of the sensing node (SN) can be made smaller, which results in a higher charge-voltage conversion efficiency. This is advantageous in applications including photon counting sensors.

Further, no special pixel structure is required, and manufacturing is facilitated.

In some embodiments, the first charge transfer gate (Tx1) and/or the reset gate (RS) are formed as MOSFET transistors.

Figure 28:
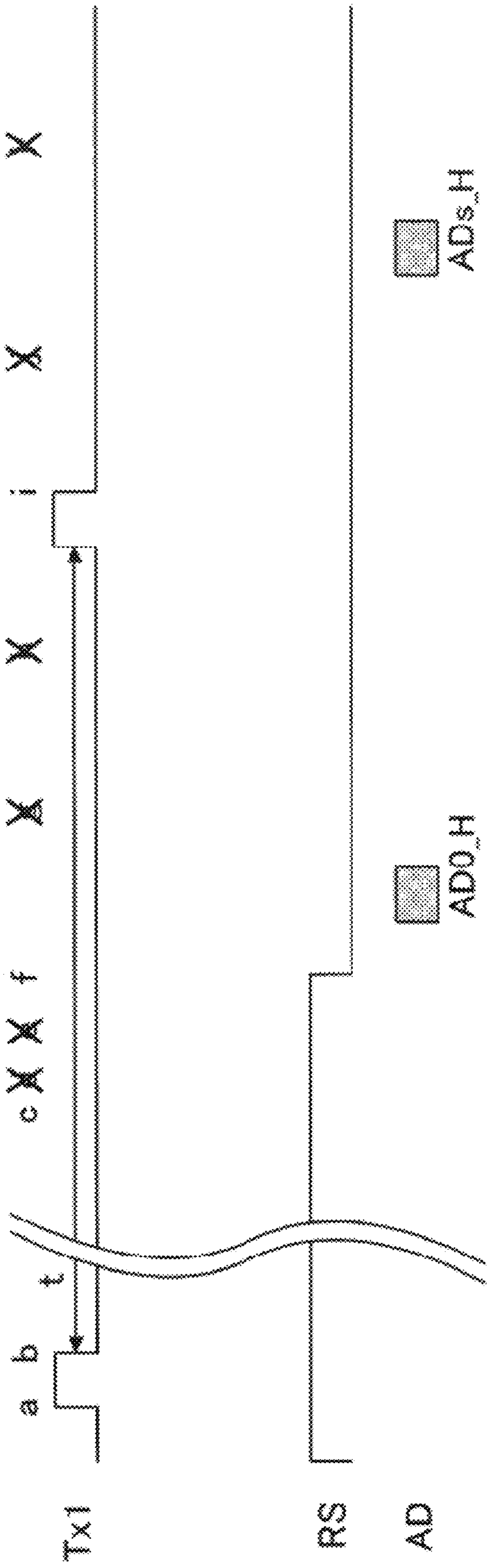
FIG. 28 is a timing chart of related control levels for operating a photosensitive pixel, according to an embodiment of the third class of the present application.

FIG. 28 is a timing chart according to an embodiment of the present application. (Although transitions at steps d, e, g, h, j, and k of FIG. 6 are not present in this embodiment, the labels d, h, and j crossed out with an X sign are shown to facilitate spotting the difference from FIG. 6.) The row labelled Tx1 indicates on/off of control signals applied to the first charge transfer gate. (In the embodiment illustrated in FIG. 28, the upper level in the graph corresponds to "on", and the lower level corresponds to "off.") When "on", charge can pass through the gate. ("On" corresponds to a high voltage, and "off" corresponds to a low voltage.) The row labelled RS indicates on/off of a control signal applied to the reset gate.

Figure 29:
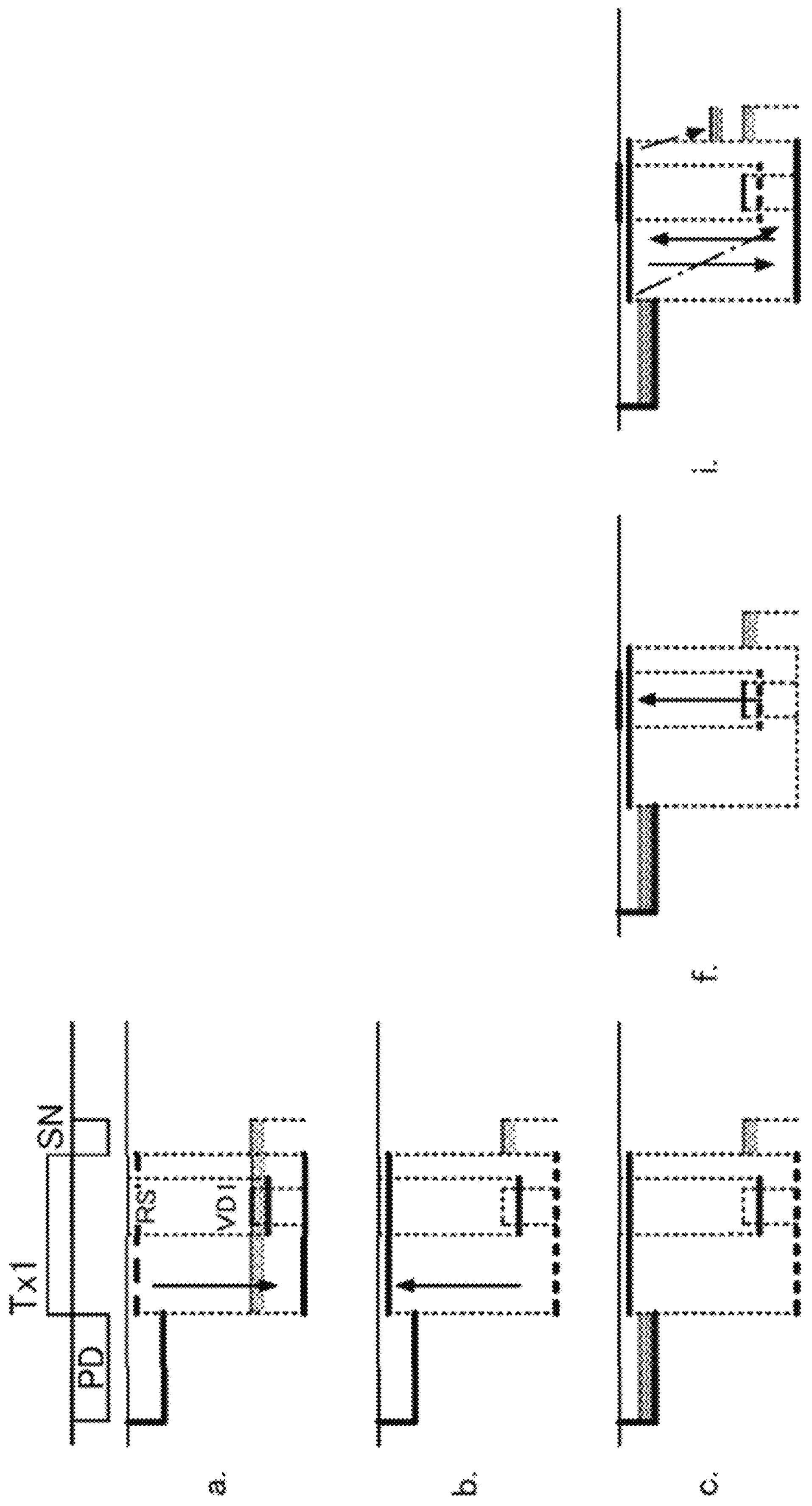
FIG. 29 illustrates potential diagrams for steps for operating a photosensitive pixel, according to an embodiment of the third class of the present application corresponding to FIG. 28.

FIG. 29 illustrates potential diagrams corresponding to the steps a-i in FIG. 28. In the potential diagrams, a lower level in the diagrams corresponds to a higher voltage and a higher level in the diagrams corresponds to a lower voltage. This means that the sign of potential is defined such that electrons move from a higher position to a lower position in the diagrams.

At (a), the photodiode (PD) is reset by clearing electric charge in the photodiode (PD). The potential diagram indicates the first charge transfer gate (Tx1) is on (that is, there is no barrier and charge is allowed to move), the reset gate (RS) is on. (In FIG. 29, the horizontal direction schematically indicates a path for electric charge from PD to Tx1, SN. The reset gate RS, which is outside of this path, overlaps ST in the illustration. Conceptually, RS may be regarded as located behind Tx1.) Potentials at the first charge transfer gate (Tx1) is at the same level (potential) as the drain VD1.

At (b), the first charge transfer gate (Tx1) is turned off (closed) to start charge accumulation (signal integration) at the photodiode (PD). Now, the sensing node (SN) is separated from Tx1, and it has now a floating potential, and is ready for measurement of electric charge accumulated on the sensing node (SN). This process is referred to as resetting of the sensing node (SN).

At (c), signal charge is accumulated at the photodiode (PD) during an accumulation period (integration period).

At (f), the reset gate (RS) is turned off. Under this condition, an analog-to-digital converter (ADC) performs a first reset-level analog-to-digital (AD) conversion (AD0_H) on an output of the amplifier coupled to the sensing node (SN). AD conversion is indicated in the row labelled AD in FIG. 28. Since electric charge from the photodiode (PD) has not been accumulated in the sensing node (SN), this is a reset-level measurement. This is used for correlated double sampling (CDS), in which a difference is taken between a signal-level measurement and this reset-level measurement. CDS is a technique that can cancel signal-independent noise such as kTC noise (thermal noise related to capacitance of the sensor circuit) by taking a difference between two measurements (samplings): an output when provided with a reset voltage ("reset-level") and an output when provided with a signal voltage ("signal-level").

At (i), the first charge transfer gate (Tx1) is turned on so that the signal charge at the photodiode (PD) is transferred to the first charge transfer gate (Tx1) and the sensing node (SN), and then the first charge transfer gate (Tx1) is turned off. By using the first charge transfer gate (Tx1) (as opposed to a mere diffusion region without electrodes), the charge transfer from the photodiode (PD) to the sensing node (SN) is a complete transfer. And then, the first charge transfer gate (Tx1) is turned off (low voltage; upper level in the potential diagram) so that signal charge at the first charge transfer gate (Tx1) is transferred to the sensing node (SN). Under this condition, the ADC performs a first signal-level AD conversion (ADs_H) on an output of the amplifier coupled to the sensing node (SN).

This AD conversion with the first charge transfer gate (Tx1) turned off as well as the AD conversion at step (f) also with the first charge transfer gate (Tx1) turned off are both associated with a higher conversion gain. Step (i) performs a signal-level measurement, while step (f) performs a reset-level measurement. These measurements are combined in CDS to provide a high-conversion-gain measurement with signal-independent noise removed.

As can be seen in step (i), the "on" state of the first charge transfer gate (Tx1) (high voltage; lower level in the potential diagram) allows storage of charge from the photodiode (PD) at the first charge transfer gate (Tx1), while the "off" state of the first charge transfer gate (Tx1) allows transfer of the charge stored at the first charge transfer gate (Tx1) to the sensing node (SN). Thus, the first charge transfer gate (Tx1) serves for storage and transfer of electric charge.

As can be seen above, the photosensitive pixel according to this embodiment supports CDS for suppressing kTC noise.

The third class of embodiments may be combined with any suitable features described in connection with the first class of embodiments. Details are not repeated for brevity's sake.

While various embodiments are described above and illustrated in the drawings, the present invention is not limited to the specific embodiment described or illustrated.

The unit division disclosed in embodiments of the present application is not limiting, and embodiments may be configured with other divisions of components.

Where appropriate, some functions may be implemented in a form of a computer program for causing a processor or a computing device to perform one or more functions. For example, various control operations may be implemented as a computer program. The computer program may be embodied on a non-transitory computer-readable storage medium. The storage medium may be any medium that can store a computer program and may be a solid-state memory such as a USB drive, a flash drive, a read-only memory (ROM), and a random-access memory (RAM); a magnetic storage medium such as a removable or non-removable hard disk; or an optical storage medium such as an optical disc. Control functions may also be implemented with discrete or integrated circuit elements.

The terms such as "first", "second" may be used to distinguish different instances of an entity, and may not indicate any ordering in terms of time, space, or rank.

The expression "A and/or B" can represent "A and B" as well as "A or B", and thus encompasses "A and B", "A", and "B." The expression "A, B, and/or C" means "A and/or B and/or C", and thus encompasses "A and B and C", "A and B", "B and C", "A and C", "A", "B", and "C." The same principle applies to any number of elements connected with "and/or."

The foregoing descriptions are merely to illustrate various embodiments of the present application, and are not intended to limit the scope of the invention. Any variation that would readily occur to a person skilled in the art in view of the present disclosure may fall within the scope of this application. For example, measures separately disclosed may be combined in a single embodiment as appropriate, as long as such measures are not mutually exclusive.

What is claimed is:

1. A photosensitive pixel, comprising:
- a photodiode for generating photoelectrons;
- a first charge transfer gate;
- a charge storage and transfer electrode;
- a second charge transfer gate;
- a sensing node;
- a reset gate coupled to the charge storage and transfer electrode;
- a drain coupled to the reset gate; and
- an amplifier coupled to the sensing node;
- wherein the first charge transfer gate is controllable via a first control signal from a controller to couple the photodiode to the charge storage and transfer electrode so as to allow charge transfer;
- wherein the second charge transfer gate is controllable via a second control signal from the controller to couple the charge storage and transfer electrode to the sensing node so as to allow charge transfer;
- wherein the second charge transfer gate, the charge storage and transfer electrode, and the reset gate are controllable via third control signals from the controller to reset an electric potential of the sensing node; and
- wherein the photodiode, the first charge transfer gate, the charge storage and transfer electrode, the second charge transfer gate, the reset gate, the drain, and the amplifier are configured to transfer charge generated at the photodiode to the sensing node.

2. The photosensitive pixel of claim 1, wherein the first charge transfer gate, the second charge transfer gate, the reset gate, and/or the charge storage and transfer electrode are formed as MOSFET transistors.

3. The photosensitive pixel of claim 1, wherein transferring the charge generated at the photodiode to the sensing node comprises:
- (a) resetting the photodiode by clearing electric charge in the photodiode;
- (b) turning off the first charge transfer gate to start charge accumulation at the photodiode;
- (c) accumulating signal charge at the photodiode during an accumulation period;
- (d) turning off the second charge transfer gate to reset the sensing node;
- (e) turning off the charge storage and transfer electrode to clear electric charge at the charge storage and transfer electrode to the drain via the reset gate;
- (f) turning off the reset gate to perform, by an analog-to-digital converter (ADC), a first reset-level analog-to-digital (AD) conversion on an output of the amplifier coupled to the sensing node;
- (g) turning on the second charge transfer gate to perform, by the ADC, a second reset-level AD conversion on the output of the amplifier coupled to the sensing node;
- (h) turning off the second charge transfer gate and turning on the charge storage and transfer electrode;
- (i) turning on the first charge transfer gate so that the signal charge at the photodiode is transferred to the charge storage and transfer electrode, turning off the first charge transfer gate, and turning off the charge storage and transfer electrode;
- (j) turning on the second charge transfer gate so that signal charge at the charge storage and transfer electrode is transferred to the sensing node, and turning off the second charge transfer gate to perform, by the ADC, a first signal-level AD conversion on the output of the amplifier coupled to the sensing node; and
- (k) turning on the second charge transfer gate to perform, by the ADC, a second signal-level AD conversion on the output of the amplifier coupled to the sensing node.

4. The photosensitive pixel of claim 3, wherein during the accumulation period, the second charge transfer gate, the charge storage and transfer electrode, and the reset gate are off.

5. The photosensitive pixel of claim 1, wherein transferring the charge generated at the photodiode to the sensing node comprises:
- (a) resetting the photodiode by clearing electric charge in the photodiode;
- (b) turning off the first charge transfer gate to start charge accumulation at the photodiode;
- (c) accumulating signal charge at the photodiode during an accumulation period;
- (d) turning off the second charge transfer gate to reset the sensing node;
- (e) turning off the charge storage and transfer electrode to clear electric charge at the charge storage and transfer electrode to the drain via the reset gate;
- (f) turning off the reset gate to perform, by an analog-to-digital converter (ADC), a first reset-level analog-to-digital (AD) conversion on an output of the amplifier coupled to the sensing node;
- (h') turning on the charge storage and transfer electrode;
- (i) turning on the first charge transfer gate so that the signal charge at the photodiode is transferred to the charge storage and transfer electrode, turning off the first charge transfer gate, and turning off the charge storage and transfer electrode; and
- (j) turning on the second charge transfer gate so that signal charge at the charge storage and transfer electrode is transferred to the sensing node, and turning off the second charge transfer gate to perform, by the ADC, a first signal-level AD conversion on the output of the amplifier coupled to the sensing node.

6. The photosensitive pixel of claim 1, wherein transferring the charge generated at the photodiode to the sensing node comprises:
- (a) resetting the photodiode by clearing electric charge in the photodiode;
- (b) turning off the first charge transfer gate to start charge accumulation at the photodiode;
- (c) accumulating signal charge at the photodiode during an accumulation period;

(d) turning off the second charge transfer gate to reset the sensing node;

(e) turning off the charge storage and transfer electrode to clear electric charge at the charge storage and transfer electrode to the drain via the reset gate;

(f) turning off the reset gate;

(h') turning on the charge storage and transfer electrode;

(i) turning on the first charge transfer gate so that the signal charge at the photodiode is transferred to the charge storage and transfer electrode, turning off the first charge transfer gate, and turning off the charge storage and transfer electrode; and (j) turning on the second charge transfer gate so that signal charge at the charge storage and transfer electrode is transferred to the sensing node, and turning off the second charge transfer gate to perform, by an analog-to-digital converter (ADC), a first signal-level analog-to-digital (AD) conversion on an output of the amplifier coupled to the sensing node.

7. The photosensitive pixel of claim 1, wherein transferring the charge generated at the photodiode to the sensing node comprises:

(a) resetting the photodiode by clearing electric charge in the photodiode;

(b) turning off the first charge transfer gate to start charge accumulation at the photodiode;

(c) accumulating signal charge at the photodiode during an accumulation period;

(d) turning off the second charge transfer gate to reset the sensing node;

(e) turning off the charge storage and transfer electrode to clear electric charge at the charge storage and transfer electrode to the drain via the reset gate;

(f) turning off the reset gate to perform, by an analog-to-digital converter (ADC), a first reset-level analog-to-digital (AD) conversion on an output of the amplifier coupled to the sensing node;

(g) turning on the second charge transfer gate to perform, by the ADC, a second reset-level AD conversion on the output of the amplifier coupled to the sensing node;

(h) turning off the second charge transfer gate and turning on the charge storage and transfer electrode;

(i') turning on the first charge transfer gate so that the signal charge at the photodiode is transferred to the charge storage and transfer electrode, turning off the first charge transfer gate;

(j') turning on the second charge transfer gate and then turning off the charge storage and transfer electrode so that signal charge at the charge storage and transfer electrode is transferred to the second charge transfer gate and the sensing node to perform, by the ADC, a second signal-level AD conversion on the output of the amplifier coupled to the sensing node; and (k') turning off the second charge transfer gate to perform, by the ADC, a first signal-level AD conversion on the output of the amplifier coupled to the sensing node.

8. The photosensitive pixel of claim 1, further comprising:

an overflow channel (OFC) for letting overflow electric charge flow out to the drain.

9. A pixel array, comprising:

a plurality of photosensitive pixels arranged in an array of a plurality of rows and a plurality of columns, wherein at least one photosensitive pixel of the plurality of photosensitive pixels comprises:

a photodiode for generating photoelectrons;

a first charge transfer gate;

a charge storage and transfer electrode;

a second charge transfer gate;

a sensing node;

a reset gate coupled to the charge storage and transfer electrode;

a drain coupled to the reset gate; and an amplifier coupled to the sensing node;

wherein the first charge transfer gate is controllable via a first control signal from a controller to couple the photodiode to the charge storage and transfer electrode so as to allow charge transfer;

wherein the second charge transfer gate is controllable via a second control signal from the controller to couple the charge storage and transfer electrode to the sensing node so as to allow charge transfer;

wherein the second charge transfer gate, the charge storage and transfer electrode, and the reset gate are controllable via third control signals from the controller to reset an electric potential of the sensing node; and wherein a respective photosensitive pixel is configured to transfer charge generated at a respective photodiode to a respective sensing node via a respective first charge transfer gate, a respective charge storage and transfer electrode, and a respective second charge transfer gate.

10. The pixel array of claim 9, wherein more than one photosensitive pixel shares a respective charge storage and transfer electrode, a respective second charge transfer gate, a respective sending node, a respective reset gate, a respective drain, and a respective amplifier.

11. A pixel array, comprising:

a plurality of groups of photosensitive pixels, wherein each group of photosensitive pixels comprises:

a plurality of photodiodes for generating photoelectrons;

a plurality of first charge transfer gates respectively associated with the plurality of photodiodes;

a shared charge storage and transfer electrode;

a shared second charge transfer gate;

a shared sensing node;

a shared reset gate coupled to the shared charge storage and transfer electrode;

a shared drain coupled to the shared reset gate; and a shared amplifier coupled to the shared sensing node;

wherein a respective first charge transfer gate is controllable via a first control signal from a controller to couple a respective associated photodiode to a respective shared charge storage and transfer electrode so as to allow charge transfer;

wherein a respective shared second charge transfer gate is controllable via a second control signal from the controller to couple the respective shared charge storage and transfer electrode to a respective shared sensing node so as to allow charge transfer;

wherein the respective shared second charge transfer gate, the respective shared charge storage and transfer electrode, and a respective shared reset gate are controllable via third control signals from the controller to reset an electric potential of the respective shared sensing node; and wherein a respective photosensitive pixel is configured to transfer charge generated at a respective plurality of photodiodes to the respective shared sensing node via a respective plurality of first charge transfer gates, the respective shared charge storage and transfer electrode, and the respective shared second charge transfer gate.

12. The pixel array of claim 11, wherein each group of photosensitive pixels comprises four photodiodes and four associated first charge transfer gates.

13. The pixel array of claim 12, wherein the four photodiodes of each group of photosensitive pixels are arranged in a 2×2 array, wherein a respective first charge transfer gate is arranged at a corner of each photodiode facing the center of the four photodiodes, and wherein a respective shared charge storage and transfer electrode is arranged at the center of the four photodiodes.

* * * * *